(12) United States Patent
Dave et al.

(10) Patent No.: US 9,999,924 B2
(45) Date of Patent: Jun. 19, 2018

(54) METHOD AND SYSTEM FOR MONITORING ADDITIVE MANUFACTURING PROCESSES

(71) Applicant: Sigma Labs, Inc., Santa Fe, NM (US)

(72) Inventors: Vivek R. Dave, Concord, NH (US); R. Bruce Madigan, Butte, MT (US); Mark J. Cola, Santa Fe, NM (US); Martin S. Piltch, Los Alamos, NM (US)

(73) Assignee: SIGMA LABS, INC., Santa Fe, NM (US)

( * ) Notice: Subject to any disclaimer, the term of this patent is extended or adjusted under 35 U.S.C. 154(b) by 264 days.

(21) Appl. No.: 14/832,691

(22) Filed: Aug. 21, 2015

(65) Prior Publication Data

US 2016/0184893 A1    Jun. 30, 2016

Related U.S. Application Data

(60) Provisional application No. 62/040,417, filed on Aug. 22, 2014.

(51) Int. Cl.
*B33Y 10/00* (2015.01)
*B22F 3/105* (2006.01)
(Continued)

(52) U.S. Cl.
CPC ........ *B22F 3/1055* (2013.01); *B29C 67/0077* (2013.01); *B29C 67/0088* (2013.01);
(Continued)

(58) Field of Classification Search
None
See application file for complete search history.

(56) References Cited

U.S. PATENT DOCUMENTS

| 4,041,476 A | 8/1977 | Swainson et al. |
|---|---|---|
| 4,247,508 A | 1/1981 | Housholder et al. |

(Continued)

FOREIGN PATENT DOCUMENTS

| WO | 2013044047 A1 | 3/2013 |
|---|---|---|
| WO | 2013128416 A2 | 9/2013 |

(Continued)

OTHER PUBLICATIONS

Kandula, et al., "On the Effective Therman conductivity of porous packed Beds with uniform spherical particles", Journal of Porous Media, 2011, 919-926.

(Continued)

*Primary Examiner* — Colleen P Dunn
*Assistant Examiner* — Rajinder Bajwa
(74) *Attorney, Agent, or Firm* — Kilpatrick Townsend & Stockton LLP

(57) ABSTRACT

This invention teaches a quality assurance system for additive manufacturing. This invention teaches a multi-sensor, real-time quality system including sensors, affiliated hardware, and data processing algorithms that are Lagrangian-Eulerian with respect to the reference frames of its associated input measurements. The quality system for Additive Manufacturing is capable of measuring true in-process state variables associated with an additive manufacturing process, i.e. those in-process variables that define a feasible process space within which the process is deemed nominal. The in-process state variables can also be correlated to the part structure or microstructure and can then be useful in identifying particular locations within the part likely to include defects.

15 Claims, 11 Drawing Sheets

(51) Int. Cl.
*B29C 67/00* (2017.01)
*B33Y 30/00* (2015.01)
*B33Y 50/02* (2015.01)
*B33Y 40/00* (2015.01)
*B22F 3/24* (2006.01)

(52) U.S. Cl.
CPC ............... *B33Y 10/00* (2014.12); *B33Y 30/00* (2014.12); *B33Y 50/02* (2014.12); *B22F 2003/1056* (2013.01); *B22F 2003/1057* (2013.01); *B22F 2003/245* (2013.01); *B33Y 40/00* (2014.12); *Y02P 10/295* (2015.11)

(56) References Cited

U.S. PATENT DOCUMENTS

| | | | |
|---|---|---|---|
| 4,323,756 A | 4/1982 | Brown et al. | |
| 4,575,330 A | 3/1986 | Hull | |
| 4,863,538 A | 9/1989 | Deckard | |
| 5,272,027 A | 12/1993 | Dillenbeck et al. | |
| 6,261,493 B1 | 7/2001 | Gaylo et al. | |
| 6,357,910 B1 | 3/2002 | Chen et al. | |
| 6,483,596 B1 | 11/2002 | Philippi et al. | |
| 6,554,600 B1 | 4/2003 | Hofmann et al. | |
| 6,672,343 B1 | 1/2004 | Perret et al. | |
| 6,824,714 B1 | 11/2004 | Türck et al. | |
| 6,932,935 B1 | 8/2005 | Oberhofer et al. | |
| 7,153,463 B2 | 12/2006 | Leuterer et al. | |
| 7,229,272 B2 | 6/2007 | Leuterer et al. | |
| 7,419,632 B2 | 9/2008 | Keller et al. | |
| 7,601,422 B2 | 10/2009 | Mueller et al. | |
| 7,628,600 B2 | 12/2009 | Perret et al. | |
| 7,661,948 B2 | 2/2010 | Perret et al. | |
| 7,665,979 B2 | 2/2010 | Heugel et al. | |
| 7,674,107 B2 | 3/2010 | Perret et al. | |
| 7,686,605 B2 | 3/2010 | Perret et al. | |
| 7,713,048 B2 | 5/2010 | Perret et al. | |
| 7,740,683 B2 | 6/2010 | Thorsson et al. | |
| 7,820,241 B2 | 10/2010 | Perret et al. | |
| 7,837,458 B2 | 11/2010 | Perret et al. | |
| 7,847,057 B2 | 12/2010 | Mueller et al. | |
| 7,850,885 B2 | 12/2010 | Philippi et al. | |
| 7,891,095 B2 | 2/2011 | Thorsson et al. | |
| 7,901,604 B2 | 3/2011 | Oberhofer et al. | |
| 7,931,462 B2 | 4/2011 | Mattes et al. | |
| 7,946,840 B2 | 5/2011 | Perret et al. | |
| 7,976,302 B2 | 7/2011 | Perret et al. | |
| 8,031,384 B2 | 10/2011 | Schimitzek et al. | |
| 8,034,279 B2 | 10/2011 | Dimter et al. | |
| 8,073,315 B2 | 12/2011 | Philippi et al. | |
| 8,075,814 B2 | 12/2011 | Fruth et al. | |
| 8,083,513 B2 | 12/2011 | Montero-Escuder et al. | |
| 8,124,192 B2 | 2/2012 | Paasche et al. | |
| 8,137,739 B2 | 3/2012 | Philippi et al. | |
| 8,172,562 B2 | 5/2012 | Mattes et al. | |
| 8,186,990 B2 | 5/2012 | Perret et al. | |
| 8,260,447 B2 | 9/2012 | Mattes et al. | |
| 8,299,208 B2 | 10/2012 | Mueller et al. | |
| 8,303,886 B2 | 11/2012 | Philippi et al. | |
| 8,313,087 B2 | 11/2012 | Hesse et al. | |
| 8,317,508 B2 | 11/2012 | Bokodi et al. | |
| 8,366,432 B2 | 2/2013 | Perret et al. | |
| 8,414,281 B2 | 4/2013 | Schleiss et al. | |
| 8,420,001 B2 | 4/2013 | Leuterer et al. | |
| 8,501,075 B2 | 8/2013 | Philippi et al. | |
| 8,525,071 B2 | 9/2013 | Leuterer et al. | |
| 8,658,078 B2 | 2/2014 | Weidinger et al. | |
| 8,710,144 B2 | 4/2014 | Weiss et al. | |
| 8,734,694 B2 | 5/2014 | Perret et al. | |
| 8,784,720 B2 | 7/2014 | Göbner et al. | |
| 8,784,721 B2 | 7/2014 | Philippi et al. | |
| 8,803,073 B2 | 8/2014 | Philippi et al. | |
| 2005/0133527 A1* | 6/2005 | Dullea | B05B 7/14 222/1 |
| 2008/0262659 A1 | 10/2008 | Huskamp et al. | |
| 2009/0206065 A1* | 8/2009 | Kruth | B22F 3/1055 219/121.66 |
| 2014/0039662 A1 | 2/2014 | Boyer et al. | |
| 2016/0098825 A1 | 4/2016 | Dave et al. | |
| 2016/0199911 A1 | 7/2016 | Dave et al. | |
| 2017/0097280 A1* | 4/2017 | Drescher | G01M 7/022 |

FOREIGN PATENT DOCUMENTS

| | | |
|---|---|---|
| WO | 2014159758 A1 | 10/2014 |
| WO | 2016115284 | 7/2016 |

OTHER PUBLICATIONS

Korner, et al., "Fundamental consolidation mechanisms during selective beam melting of powders", Modeling and Simulation in Materials Science and Engineering, Nov. 8, 2013, 18 pages.
PCT/US2016/013303, "International Search Report and Written Opinion", dated Mar. 29, 2016, 12 pages.
Hamilton, et al., "Radiant-Interchange configuration factors", NACA-TN-2836, Dec. 1, 1952, 111 pgs.

* cited by examiner

METHOD AND SYSTEM FOR MONITORING ADDITIVE MANUFACTURING PROCESSES

CROSS-REFERENCES TO RELATED APPLICATIONS

This application claims priority under 35 U.S.C. 119(e) to U.S. Provisional Patent Application No. 62/040,417, filed on Aug. 22, 2014, and entitled "QUALITY ASSURANCE SYSTEM FOR MANUFACTURING," the disclosure of which is incorporated by reference in its entirety and for all purposes.

BACKGROUND OF THE INVENTION

Additive manufacturing, or the sequential assembly or construction of a part through the combination of material addition and applied energy, takes on many forms and currently exists in many specific implementations and embodiments. Additive manufacturing can be carried out by using any of a number of various processes that involve the formation of a three dimensional part of virtually any shape. The various processes have in common the sintering, curing or melting of liquid, powdered or granular raw material, layer by layer using ultraviolet light, high powered laser, or electron beam, respectively. Unfortunately, established processes for determining a quality of a resulting part manufactured in this way are limited. Conventional quality assurance testing generally involves destruction of the part. While destructive testing is an accepted way of validating a part's quality, as it allows for close scrutiny of various internal portions of the part, such tests cannot for obvious reasons be applied to a production part. Consequently, ways of non-destructively verifying the integrity of a part produced by additive manufacturing is highly desired.

SUMMARY OF THE INVENTION

The present invention relates generally to methods and systems for non-destructively characterizing a structural integrity of parts created by additive manufacturing processes. For example, some embodiments relate to quality assurance processes for monitoring the production of metal parts using additive manufacturing techniques. More specifically, embodiments relate to monitoring thermal emissions during an additive manufacturing process to identify microstructural defects generated during the additive manufacturing process.

The described embodiments are related to a large subcategory of additive manufacturing, which involves using an energy source that takes the form of a moving region of intense thermal energy. In the event that this thermal energy causes physical melting of the added material, then these processes are known broadly as welding processes. In welding processes, the material, which is incrementally and sequentially added, is melted by the energy source in a manner similar to a fusion weld.

When the added material takes the form of layers of powder, after each incremental layer of powder material is sequentially added to the part being constructed, the heat source melts the incrementally added powder by welding regions of the powder layer creating a moving molten region, hereinafter referred to as the weld pool, so that upon solidification they become part of the previously sequentially added and melted and solidified layers below the new layer that includes the part being constructed. As additive machining processes can be lengthy and include any number of passes of the weld pool, it can be difficult to avoid at least slight variations in the size and temperature of the weld pool as the weld pool is used to solidify the part. It should be noted that additive manufacturing processes are typically driven by computer numerical control (CNC) due to the high rates of travel of the heating element and complex patterns needed to form a three dimensional structure.

One way to measure and characterize the quality of the final part is to add one or more sensors to an additive manufacturing tool set that provide in-process measurements during the additive manufacturing process. The in-process measurements can be provided by sensors configured to precisely monitor a temperature of the weld pool as it constructs the part. In this way, any variations in temperature of the weld pool during the construction can be recorded and characterized. In some embodiments, temperature variations exceeding a particular threshold can be recorded for later analysis that can lead to a determination of whether or not a part meets a set of quality assurance standards. The analysis can include aggregating data from multiple sensors to determine particular cooling rates of the material during the construction process. State variables can be derived from the aforementioned sensor measurements (i.e., measurements that characterize the current state or evolution over time of the in-process physical behaviors) and be used to determine the presence of any micro-structural variations or even cracks occurring as a result of variations detected by the sensors. Exemplary state variables include cooling rates, heating rates, peak temperature and phase change information that can be associated with various locations for distinct locations on each layer of a part created by the additive manufacturing operation.

According to embodiments of the present invention, methods and systems for determining the quality of a part produced by additive manufacturing are provided. The quality assurance system can monitor the additive manufacturing process in real-time using a number of different sensors. The quality assurance system can operate by calculating in-process state variables from sensor readings taken in both Lagrangian and Eulerian frames of reference during an additive manufacturing process. The in-process state variables can then be used to identify locations of the part likely to include microstructural defects. In some embodiments, the additive manufacturing process can include the production of a witness coupon that can be destructively examined without causing harm to the part.

In some embodiments, an additive manufacturing method can be performed by carrying out at least the following: depositing a layer of metal material; melting a region of the layer of metal material to form a part being produced by the additive manufacturing method with a heat source that scans across the region of the layer of metal material to melt the region; monitoring an amount of energy emitted by the scanning heat source with a first optical sensor that follows a path along which the heat source scans the region to provide a first information set; monitoring a fixed portion of the region of the layer of metal material with a second optical sensor to provide a second information set; and subsequent to melting the region of the layer of metal material, determining whether the information sets indicate the region falls within a known-good range of a baseline dataset associated with the part being produced by the additive manufacturing method by: correlating data included in the second information set with data included in the first information set, the data correlated from the first and second information sets being collected while the heat source passed through the fixed portion of the region; calculating a number of state variables using at least a portion of the first information set and at least a portion of the second information set; and comparing the plurality of state variables with a plurality of ranges associated with state variables of the known-good range of the baseline dataset.

In some embodiments, an automated additive manufacturing apparatus for producing a part on a powder bed includes at least the following elements: a heat source; a processor; a scan head configured to direct energy received from the heat source towards a layer of powder arranged on the powder bed in a pattern defined by the processor that corresponds to a shape of the part; a first optical sensor configured to determine a temperature associated with a fixed portion of the part; and a second optical sensor configured to receive light emitted by a portion of the layer of powder being melted by the energy from the heat source through the scan head. The processor is configured to receive sensor data from the first and second optical sensors during an additive manufacturing operation to characterize a quality of various portions of the part.

In some embodiments, an additive manufacturing method for determining a baseline dataset for producing a part includes at least the following steps: collecting temperature data captured by multiple sensors for each layer deposited during each of a number of additive manufacturing operations for constructing the part, a first portion of the additive manufacturing operations being conducted using nominal parameter ranges and a second portion of the additive manufacturing operations being conductive using off-nominal parameter ranges, the off-nominal parameter ranges being those ranges expected to produce undesirable material defects in the part; performing metallurgical evaluations on a fixed location of each of the parts, the fixed location corresponding to a location on the part where a field of view of a first optical sensor of the sensors remains fixed during each of the additive manufacturing operations and a field of view of a second optical sensor of the sensors periodically passes through the location; categorizing the sensor data collected from the sensors into nominal and off-nominal data ranges; and establishing a baseline dataset for the part which includes in-process limits for the sensor data shown to result in the part having acceptable material properties.

It should be noted that the aforementioned process is used throughout this specification for exemplary purposes only and the processes described herein could also be applied with some modification to other additive manufacturing processes including any of the following: selective heat sintering, selective laser sintering, direct metal laser sintering, selective laser melting, fused deposition modelling and stereo lithography.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION OF SPECIFIC EMBODIMENTS

Figure 1:
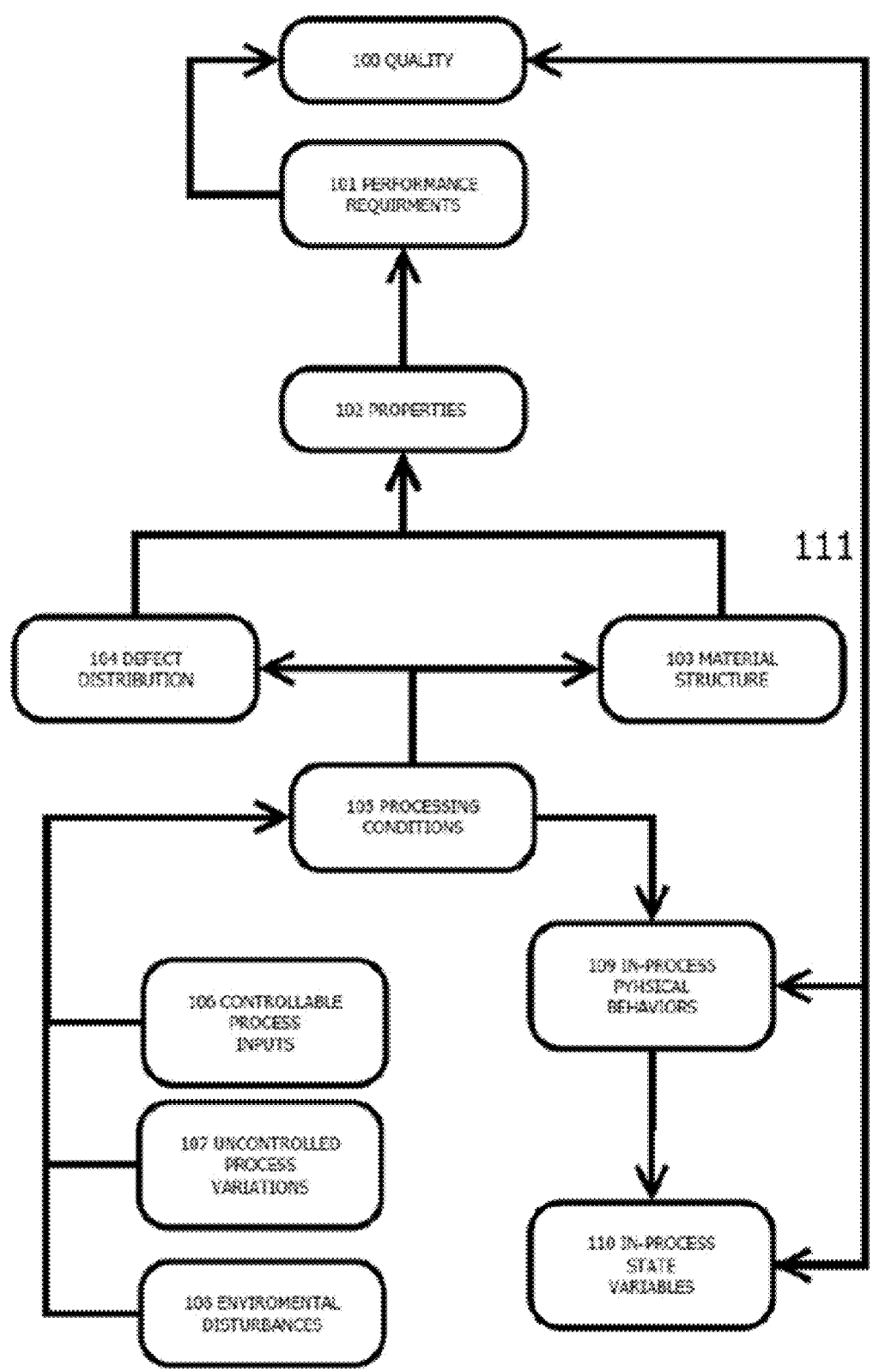
FIG. 1 is a flowchart depicting how in-process measurements and data relate to quality.

Embodiments of the present invention relate to methods and systems for conducting quality assurance monitoring during additive manufacturing processes.

Additive manufacturing or the incremental and sequential assembly or construction of a part through the combination of material addition and applied energy, takes on many forms and currently exists in many specific implementations and embodiments.

3D printing or additive manufacturing is any of various processes for making a three dimensional part of virtually any shape from a 3D model or from an electronic data file derived from a scan of a model or from a 3D CAD rendering. The various processes have in common the sintering, curing or melting of liquid, powdered or granular raw material, layer by layer using ultraviolet light or a high power laser, or electron beam, respectively.

An electron beam process (EBF3) was originated by NASA Langley Research Laboratory. It uses solid wire as the feed stock in a vacuum environment as well as when possible, in zero gravity space capsules. The process is notable for its sparing use of raw material. A focused high power electron beam is translated and creates a melt pool on a metallic surface into which the wire raw material is fed under the guidance of a coded deposition path. It has been used to produce components in sizes from fractions of an inch to tens of feet, limited only by the size of the vacuum chamber and the amount and composition of the wire feedstock that is available.

Selective heat sintering (SHS) uses thermoplastic powders that are fused by a heated printhead. After each layer is fused, it is lowered by a moveable baseplate and a layer of fresh thermoplastic powder is replenished in preparation for the next traversal of the printhead.

Selective laser sintering (SLS) uses a high power laser to fuse thermoplastic powders, metal powders and ceramic powders. This is also a scanning technology where the laser path for each layer is derived from a 3D modeling program. During the construction process, the part is lowered by a moveable support by exactly one powder layer thickness to maintain the laser's focus on the plane of the powder.

Direct metal laser sintering (DMLS), nearly identical to SLS, has been used with nearly any metal or alloy.

Selective laser melting (SLM) has been used for titanium alloys, chromium/cobalt alloys, stainless steels and aluminum. Here, the material is not sintered but is completely melted using a high power laser to create fully dense components in a layerwise fashion.

Fused deposition modelling (FDM), is an extrusion process where a heated nozzle melts and extrudes small beads of material that harden immediately as they trace out a pattern. The material is supplied as a thermoplastic filament or as a metal wire wound on a coil and unreeled through the supply nozzle. The nozzle position and flow is computer controlled in three dimensions.

One way of measuring and characterizing the quality of a metal part made with an additive manufacturing process is to add a number of temperature characterizing sensors to an additive manufacturing tool set that monitor and characterize the heating and cooling that occurs during formation of each layer of the part. This monitoring and characterizing can be provided by sensors configured to precisely monitor a temperature of portions of each layer undergoing heating and cooling at any given time during the manufacturing operation. When a heating source along the lines of a laser produces the heat necessary to fuse each layer of added material, the heated portion of the layer can take the form of a weld pool, a size and temperature of which can be recorded and characterized by the sensors. Real-time or post-production analysis can be applied to the recorded data to determine a quality of each layer of the part. In some embodiments, recorded temperatures for each part can be compared and contrasted with temperature data recorded during the production of parts having acceptable material properties. In this way, a quality of the part can be determined based upon characterization of any temperature variations occurring during production of the part.

These and other embodiments are discussed below with reference to FIGS. 1-9; however, those skilled in the art will readily appreciate that the detailed description given herein with respect to these figures is for explanatory purposes only and should not be construed as limiting.

FIG. 1 shows a block diagram describing how QUALITY 100 is related to various elements related to an additive manufacturing process. QUALITY 100 is defined as the ability of a manufactured part or article to meet the PERFORMANCE REQUIREMENTS 101 of the larger system of which it is a part.

These PERFORMANCE REQUIREMENTS 101 are functions of the engineering system (e.g. aircraft, automobile, etc.) but they imply certain PROPERTIES 102 of the part that must be met. Examples of such properties include but are not limited to: physical part dimensions, part surface roughness and surface quality, static tensile strength, thermo-physical properties (e.g. density, thermal conductivity, etc.), life and dynamic endurance properties such as fatigue strength, impact strength, fracture toughness, etc.

The PROPERTIES 102 of a part made out of any substance are determined by the MATERIAL STRUCTURE 103 of the matter comprising the part as well as the DEFECT DISTRIBUTION 104 of anomalies, defects, or other imperfections that exist within the part—either on its surface or in its volume. Both the MATERIAL STRUCTURE 103 and the DEFECT DISTRIBUTION 104 are function of the PROCESSING CONDITIONS 105 that made the part.

PROCESSING CONDITIONS 105 can be dictated by CONTROLLABLE PROCESS INPUTS 106, UNCONTROLLED PROCESS VARIATIONS 107, and ENVIRONMENTAL DISTURBANCES 108. The result of CONTROLLABLE PROCESS INPUTS 106, UNCONTROLLED PROCESS VARIATIONS 107, and ENVIRONMENTAL DISTURBANCES 108 is the set of physical behaviors that occurs while the manufacturing or additive manufacturing process in occurring, and these are known as IN-PROCESS PHYSICAL BEHAVIORS 109.

Along with each IN-PROCESS PHYSICAL BEHAVIOR 109, there may be one or more variables that can be used to either directly or indirectly measure the current state of the manufacturing process. These are called IN-PROCESS STATE VARIABLES 110. They are STATE VARIABLES in the true sense of the definition, namely that a complete knowledge of these IN-PROCESS STATE VARIABLES 110 completely describes the current state of the manufacturing process. For example, IN-PROCESS STATE VARIABLES 110 can include a rate at which various regions of the part heat up or cool down. The cooling rate can be extrapolated by measuring a temperature of a surface of one or more regions of the part as it cools. In some embodiments, temperature data can be optically determined by sensors such as a pyrometer, infrared camera, and/or photodiode. Temperatures obtained in this way can also be utilized to make determinations about the values of other state variables such as times at which solidification and melting occur. State variables can also include a peak temperature reached for a given area or portion of the material being used to form the part.

Therefore, one way of determining QUALITY 100 of a part produced by an additive manufacturing operation is to measure parameters during the additive manufacturing operation that can be used to determine the IN-PROCESS STATE VARIABLES 110. A CORRELATION BETWEEN IN-PROCESS STATE VARIABLES AND POST-PROCESS QUALITY 111 therefore exists and forms the basis for some of the embodiments of the present invention described herein.

Figure 2A:
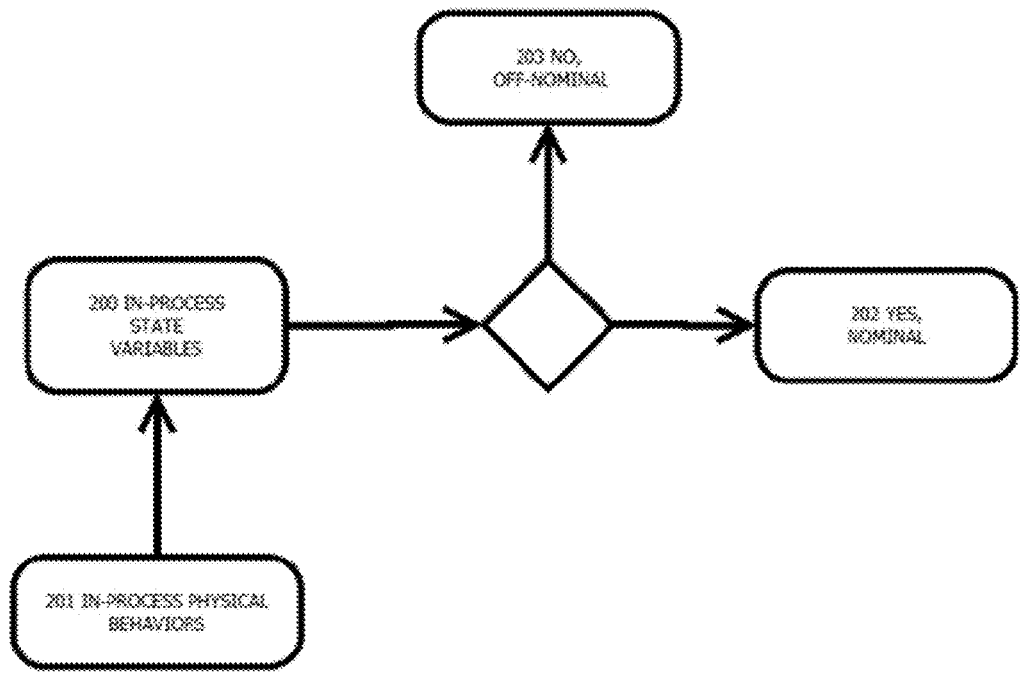
FIG. 2A shows a simplified version of the flowchart depicted in FIG. 1.
Figure 2B:
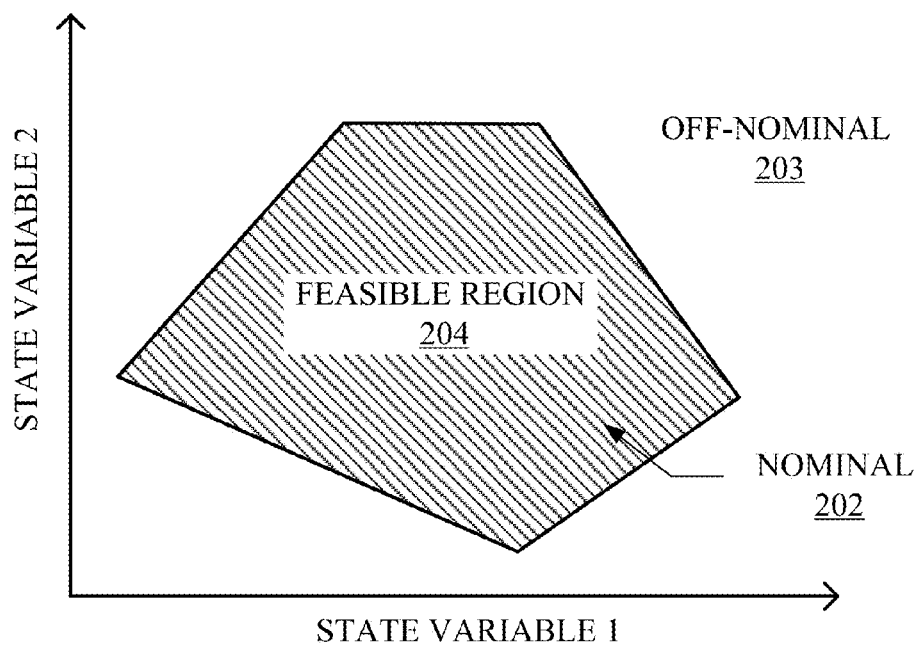
FIG. 2B shows a feasible process region based on in-process data represented by state variables as opposed to process inputs.

In FIG. 2, a more concise restatement of the description above is as follows: By measuring IN-PROCESS STATE VARIABLES 200, it is possible to understand the current state of the process; by knowing the current state of the process, it is possible to understand the IN. PROCESS PHYSICAL BEHAVIORS 201 and to classify them as being NOMINAL 202 or OFF-NOMINAL 203. This classification is predicated upon the existence of a FEASIBLE PROCESS SPACE 204 as defined in the coordinate system of the IN-PROCESS STATE VARIABLES 200, and by definition the process is in a NOMINAL 202 state when it is within the bounds of the FEASIBLE PROCESS SPACE 204. It should be noted that while FEASIBLE PROCESS SPACE 204 appears to be a two dimensional space, that in fact many more variables can contribute towards defining FEASIBLE PROCESS SPACE 204. Therefore, according to some embodiments of the present invention, the state variables are utilized to define the feasible process space rather than the input variables that are used for operating the system. The input variables, for example, laser power and scan speed, which are typically used to define the feasible process space, result in in-process physical behaviors, for example, melt pool temperature. For example, in some embodiments, other in-process physical behaviors include melt pool temperature gradient, melt pool volume, melt pool natural frequency of oscillation, melt pool vaporization, melt pool spectral emission, such as melt pool infrared emission and melt pool optical emission, and the like. Both intrinsic (i.e., dependent on the melt pool volume) and extrinsic (i.e., not dependent on the melt pool volume) physical behaviors are included in the range of in-process physical behaviors included in the present invention. As described more fully herein, these in-process physical behaviors can be measured to provide in-process variables, also referred to as state variables.

This method of in-process quality control can be applied to a very wide range of manufacturing processes. However, within the scope of Additive Manufacturing processes, it is useful to consider the class of Additive manufacturing processes in which there is a moving molten or otherwise plasticized or thermally affected region that travels across the surface of the part that is being built up. Either the material to be added is pre-placed as in the case of a powder bed process, or could be added to the molten or plasticized or otherwise thermally affected region.

Figure 3:
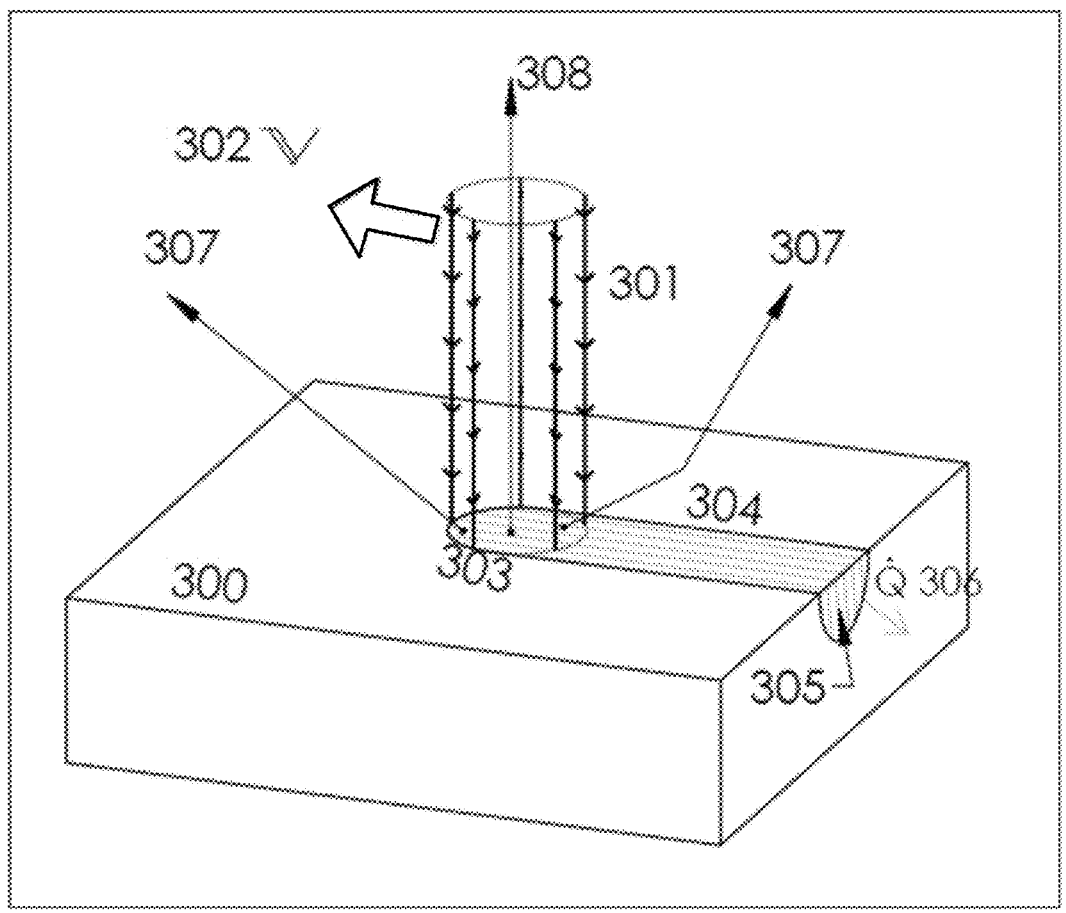
FIG. 3 shows a schematic view of an exemplary additive manufacturing process based on a moving region of intense thermal energy generating a melt pool or highly thermally affected region.

FIG. 3. shows the key physical phenomena occurring during such an Additive Manufacturing process as described above. The substrate 300 is the part that is being built up. An energy source 301 impinges on the surface of the substrate 300. Energy source 301 has a translational velocity 302, specified by the symbol V, and while it moves along some trajectory on the substrate 300 it creates a molten or plasticized or otherwise thermally affected region 303. Immediately in the wake of the moving thermally affected region 303 there is a thermally cycled region 304 of the substrate 300 that has been thermally affected and has cooled back down to the nominal temperature of the substrate 300. For example in the case of a laser sintering process occurring on a preplaced powder bed, the thermally cycled region 304 corresponds to the track of powders just melted and solidified/sintered by the moving energy source 301. This thermally cycled region 304 will in general have a profile 305 below the surface of the substrate 300.

Considering an overall energy balance for the moving energy source 301, there will be radiated and conducted energy that also carries valuable signal and information content with respect to the key physical phenomena occurring in the thermally affected region 303. For example, heat conduction 306, indicated by a heat flux Q, will result in heat flow from the thermally affected region 303 and the thermally cycled region 304. This flux will in general be normal to the contour of the profile 305 of the thermally affected region below the surface of the substrate 300. Additionally, there will be radiated signals and information 307 that could be in the form of optical radiation or acoustic radiation in the case that the Additive Manufacturing process in question occurs in some controlled atmosphere and not in a vacuum. Lastly, there could be back-reflected signals 308 that could be 100% collinear with the incident energy source 301 or could be at a slight offset angle. For example, in the case that the incident energy source 301 is a laser that operates in the near infrared, the back-reflected signal 308 may be optical radiation that travels back through the laser optics but that does not interfere with the incident beam as the incident beam is in the near infrared. These signals and others, which could indicate the state of the machine and the state of the process, collectively constitute the IN-PROCESS STATE VARIABLES that define the current state of the IN-PROCESS PHYSICAL BEHAVIORS that determine QUALITY.

Figure 4A:
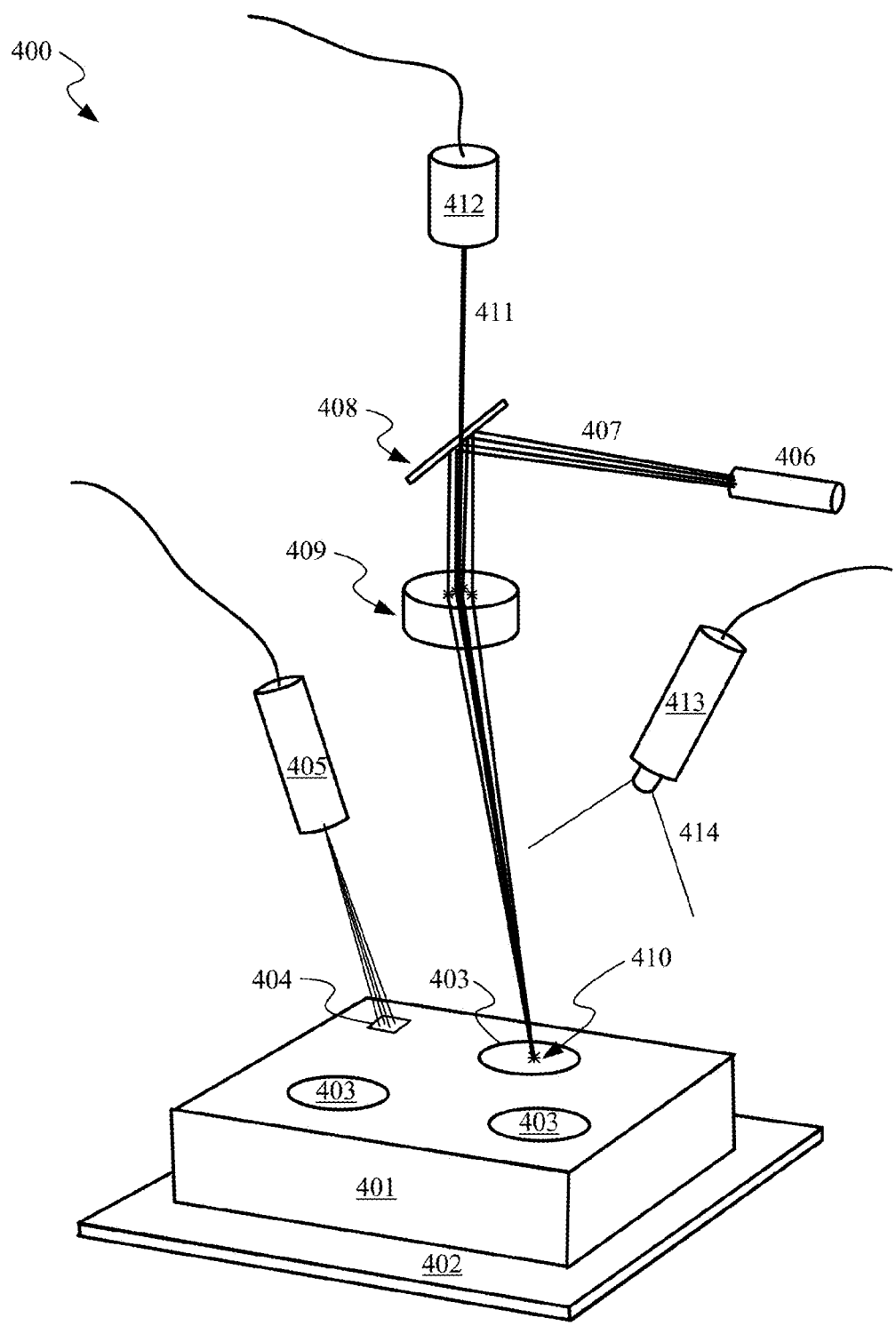
FIGS. 4A-4B show perspective views of an additive manufacturing system utilizing a scanning laser beam and sensors utilized to provide in-process measurements.

FIG. 4A is a schematic diagram illustrating a quality control system 400 according to an embodiment of the present invention. The quality control system 400 can be utilized in conjunction with Additive Manufacturing processes in which the moving heat source is a laser and the material addition could be either through the sequential pre-placement of layers of metal powders to form a volume of powder 401, as depicted, on a powder bed 402, or the material addition could be accomplished by selectively placing powder straight into the molten region generated by the moving laser on the part. The volume of powder 401 has several distinct build regions 403, which are being built up. In the case of the depicted embodiment, the buildup is accomplished by the application of the heat source to the material build regions 403, which causes the deposited powder in those regions to melt and subsequently solidify into a part having a desired geometry. The various regions 403 could be different portions of the same part, or they could represent three entirely different parts, as depicted.

As illustrated in FIG. 4A, a witness coupon 404 is provided. Witness coupon 404 is a standardized volume element that will be called a witness coupon, which allows the sampling of every production build and which represents a small and manageable but still representative amount of material which could be destructively tested for metallurgical integrity, physical properties, and mechanical properties. For every layer that is put down, the witness coupon 404 also has a layer of material put down concurrent to the layer being processed in the distinct build regions 403. There is an optical sensor 405, for example a pyrometer, directly interrogating the witness coupon 404. For purposes of clarity, optical sensor 405 is represented as a pyrometer herein although it will be evident to one of skill in the art that other optical sensors could be utilized. The pyrometer 405 is fixed with respect to the powder bed 402 and collects radiation from a fixed portion of the volume of powder 401, i.e., the witness coupon 404.

In the instance where the Additive Manufacturing process includes a scanning laser impinging on powder bed 402, the laser source 406 emits a laser beam 407 that is deflected by a partially reflective mirror 408. Partially reflective mirror 408 can be configured to reflect only those wavelengths of light that are associated with wavelengths of laser beam 407, while allowing other wavelengths of light to pass through partially reflective mirror 408. After being deflected by mirror 408, laser beam 407 enters scan head 409. Scan head 409 can include internal x-deflection, y-deflection, and focusing optics. The deflected and focused laser beam 407 exits the scan head 409 and forms a small, hot, travelling melt pool 410 in the distinct build regions 403 being melted or sintered layer by layer. Scan head 409 can be configured to maneuver laser beam 407 across a surface of the volume of powder 401 at high speeds. It should be noted that in some embodiments, laser beam 407 can be activated and deactivated at specific intervals to avoid heating portions of the volume of powder 401 across which scan head 409 would otherwise scan laser beam 407.

Melt pool 410 emits optical radiation 411 that travels back through scan head 409 and passes through partially reflective mirror 408 to be collected by optical sensor 412. The optical sensor 412 collects optical radiation from the travelling melt pool 410 and therefore, images different portions of the volume of powder 401 as the melt pool 410 traverses the volume of powder. A sampling rate of optical sensor 412 will generally dictate how many data points can be recorded as melt pool 410 scans across the volume of powder 401. The optical sensor 412 can take many forms including that of a photodiode, an infrared camera, a CCD array, a spectrometer, or any other optically sensitive measurement system. As an example, if a spectrometer is utilized, data related to the chemical content of the melt pool can be obtained, providing insight into the materials/species that are vaporized from the melt pool as well as, or in addition to insight into the materials/species that are remaining in the melt pool. In addition to pyrometer 405 and optical sensor 412, quality control system 400 can also include optical sensor 413. Optical sensor 413 can be configured to receive optical information across a wide field of view 414 so that real time monitoring of substantially all of the volume of powder 401 can be realized. As with optical sensor 412, optical sensor 413 can take many forms including that of a photodiode, an infrared camera, a CCD array, and the like. By adding optical sensor 413 to quality control system 400, which continuously monitors all of the volume of powder 401, quality control system 400 gains an additional set of sensor data that includes Eulerian data for any point on the volume of powder 401. In configurations where optical sensor 413 is setup to distinguish relative amounts of emitted heat, readings from pyrometer 405 can be used to calibrate optical sensor 413 so that heat readings across the entire surface of the volume of powder 401 can be continuously recorded and analyzed for irregularities. Additionally, quantitative temperature information can be measured at all locations of the volume of powder 401 using optical sensor 413.

Figure 4B:
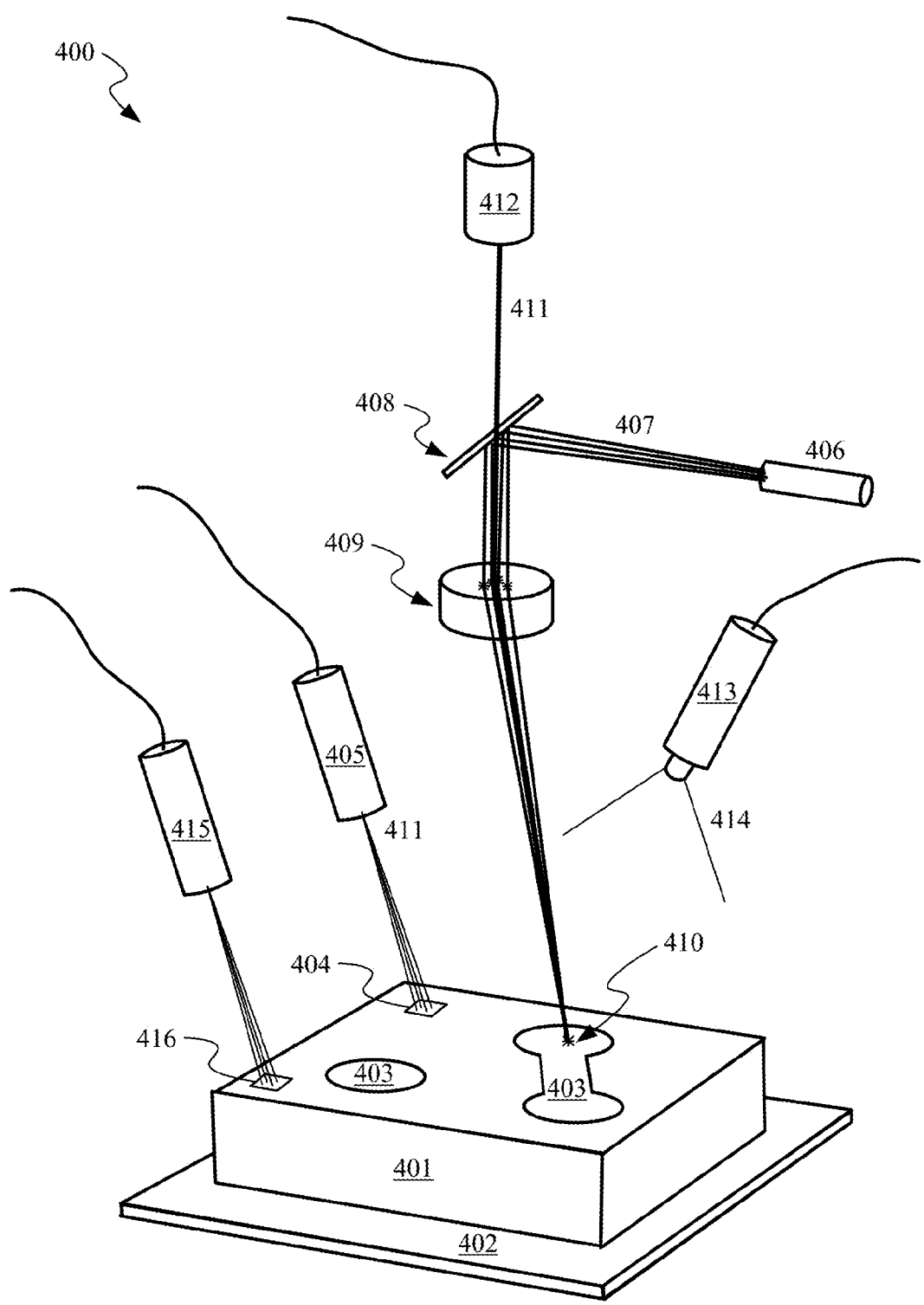

FIG. 4B shows an alternative arrangement in which a second pyrometer 415 can be arranged to monitor another witness coupon 416. By including a second pyrometer, when abnormalities occur that place a temperature gradient outside of known-good operating parameters while melt pool 410 passes through witness coupon 404, witness coupon 416 can be used to validate conditions for the particular layer that corresponds to the out of parameter heat excursion. In some embodiments, analysis could switch entirely to witness coupon 416 given such a circumstance occurring. In this way, one abnormality occurring at the wrong place and/or time no longer compromises the ability of the part to be characterized by analysis of the witness coupon. In some embodiments, an accuracy of the first and second pyrometers could be quite different. For example, first pyrometer 405 could have a substantially higher sensitivity to temperature than pyrometer 415. Other variations between the pyrometers are also possible such as, for example, a size of the footprint in which each pyrometer samples.

While both FIGS. 4A and 4B show and demonstrate the use of a witness coupon, it should be understood that in some cases once a manufacturing operation is well understood, one or more of the pyrometers can instead be focused on a portion of one of build regions 403. While such a configuration may preclude the destructive analysis of a portion of a production part, once the process is well understood, confidence in the described thermal analysis may be high enough to accept a part without destructive analysis of a witness coupon for production runs in which thermal heat excursions don't exceed a predetermined threshold. In yet another embodiment, when multiple parts are being concurrently manufactured, one of the parts can take the form of the witness coupon. In this way, one out of a number of parts having the same size and geometry can be analyzed to provide additional insight into temperature characteristics experienced by the other parts, and even more closely predict grain structure of the other parts being concurrently produced.

When melt pool 410 passes through the region of witness coupon 404, both the Eulerian pyrometer 405 (i.e., the pyrometer 405 interrogates a fixed portion of the region of the metal material that is being additively constructed, thereby providing measurements in a stationary frame of reference) and the Lagrangian optical sensor 412 (i.e., the optical sensor 412 images the location at which the laser energy is incident, thereby providing measurements in a moving frame of reference) are looking at the same region in space. At the witness coupon, signals from the Eulerian pyrometer 405, Lagrangian optical sensor 412, and optical sensor 413 will be present, a condition that can be associated with the witness coupon. Calibration of the readings from the sensors can thus be performed when the melt pool overlaps the witness coupon. In an embodiment in which a narrowly focused Eulerian photodetector collecting radiation only from the region of the witness coupon (not shown) is provided in conjunction with the witness coupon, calibration of the optical sensor 412 can be performed when the melt pool overlaps with the witness coupon.

In some embodiments, a narrowly focused photodiode is focused on the area of the witness coupon. In these embodiments, the photodiode collects spectral emissions from the witness coupon, which is converted to a weld pool when the laser source passes through the witness coupon. The spectral emissions can be ultraviolet, visible, or infrared depending on the temperature of the melt pool. In some implementations, multiple photodiodes can be utilized to capture spectral emission over a number of spectral bandwidths. The photodiode can be used to collect the spectral emissions and these measurements can be correlated to the state variables, such as the size of the weld pool, the temperature of the weld pool, weld pool temperature gradient, and the like. One of ordinary skill in the art would recognize many variations, modifications, and alternatives.

Figure 5:
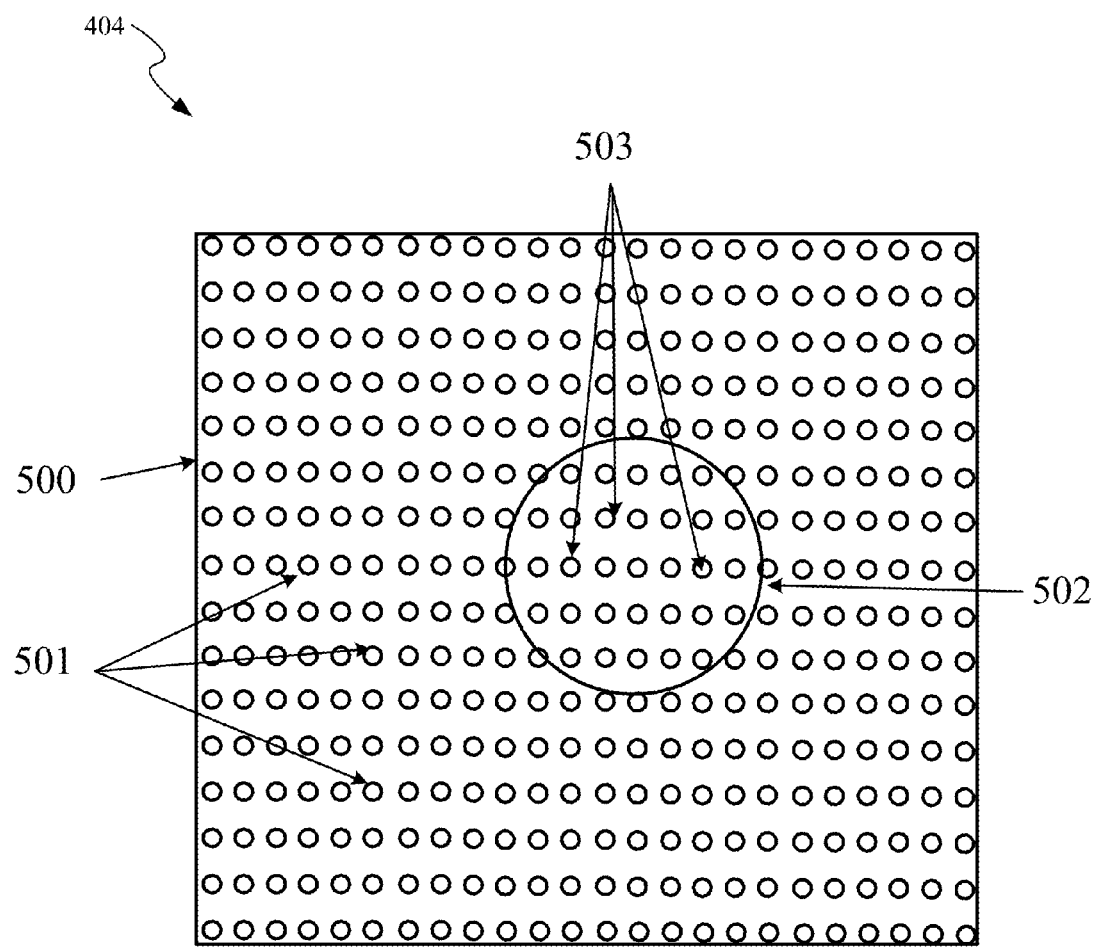
FIG. 5 shows a schematic view showing collection of Lagrangian and Eulerian data on a witness region or witness coupon.

In FIG. 5, the witness coupon area 500 for a given layer is shown. The Lagrangian optical sensor 412 will operate at a finite sampling rate as the beam scans the area of the witness coupon, and it will collect data at discrete sampling locations 501. The Eulerian pyrometer will examine a fixed field of view 502 that is located within the larger area of the witness coupon 500. In general, there will be a set of Lagrangian optical sensor readings 503 (which can be considered as the field of view of the optical sensor 412) that fall within the field of view of the Eulerian pyrometer 502. This will hold true on a layer by layer basis. Therefore in the witness coupon 500, both Lagrangian and Eulerian measurements will be available. Furthermore, the witness coupon 500 will be subject to post-process destructive examination. Therefore there will be a change to further correlate microstructural and even mechanical properties data to the correlations conducted layer by layer during the build.

Although the Lagrangian optical sensor readings 503 are illustrated as smaller than the field of view of the Eulerian pyrometer 502, this is not required by the present invention. In some embodiments, an optical imaging sensor could be utilized as the optical sensor 412 to provide imaging of the area of the witness coupon, as well as other areas. In these embodiments, in-process state variables, such as the weld pool size could be determined using data collected by the optical sensor 412. One of ordinary skill in the art would recognize many variations, modifications, and alternatives.

Generally speaking, the Lagrangian optical sensor signal will be a function of the optical or infrared energy radiated from the weld pool and collected back through the scanner optics into the optical detector. This will have several factors that will determine an overall transfer function that will link the radiation emitted at the source to the signal measured at the detector. Most generically, the transfer function may be represented as:

$$T = T\{\varepsilon, dA, F(x,y), \rho_{mirror}, \sigma_{sensor}\} \quad (1)$$

Where ε is the emissivity of the weld pool area that is radiating, dA is the weld pool area that is radiating and is considered small with respect to the area of the output lens of the scanner unit, F(x,y) is the view factor relating the small area of the weld pool to the area of the output lens on the scanner, $\rho_{mirror}$ is the wavelength dependent reflectivity of the mirror which splits the sensor signal whilst allowing the primary laser energy to pass through, and $\sigma_{sensor}$ is the wavelength-dependent sensitivity of the optical sensor with respect to the incident radiation.

The general relationship between the signal measured by the optical sensor and the energy emitted or radiated by the weld pool at a given location and a given time is therefore given by:

$$S(x,y,t) = T(x,y) \cdot E_{weldpool}(x,y,t) \quad (2)$$

Figure 6:
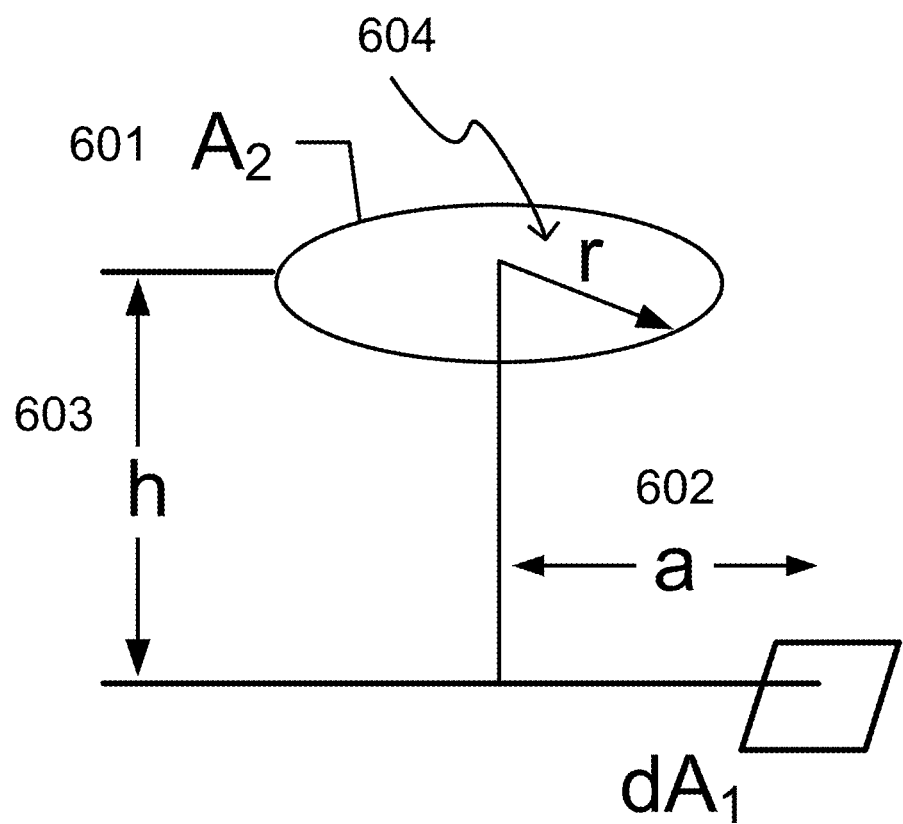
FIG. 6 shows a schematic view illustrating the radiation view factor from a differential element to a disk, both in parallel planes, but with an offset in their respective central axes.

The view factor can be approximated as shown in FIG. 6. The small area of the weld pool 600 is represented by $dA_1$ and the area of the exit lens for the scan head 601 is represented by $A_2$. The weld pool is in the plane of a top layer of the powder bed but is generally not directly beneath the exit lens of the scan head 601 and is displaced by a distance 602 in the plane represented by a. The work height 603 is the distance from the exit lens 601 for the scan head to the powder bed and is represented by h. The exit lens of the scan head 601 has a radius 604 which is represented by r.

The view factor is given by the following mathematical relationship, which was originally derived by Hamilton and Morgan:

$$F_{d1-2} = \frac{1}{2}\left[1 - \frac{Z - 2R^2}{(Z^2 - 4R^2)^{1/2}}\right] \quad (3)$$

where $$H = \frac{h}{a}, R = \frac{r}{a}, \text{ and } Z = 1 + R^2 + H^2 \quad (4)$$

The variable a can also be related to the x and y position on the plane of the powder bed. If we assume that the position directly below the center of the exit lens of the scan head is the origin of a coordinate system in the plane of the powder bed, then the variable a is related to the x and y position of the weld pool by the relationship:

$$a = \sqrt{x^2 + y^2} \quad (5)$$

These x and y positions can in turn be found from the drive signals that control the beam deflection within the scan head. For example, in a high speed laser scanner, these x and y positions may be controlled by mirrors which are actuated by high frequency response galvanometers.

The reflectivity of the mirror will be defined in terms of a range of wavelengths over which the mirror will reflect the radiation within that wavelength with a high degree of reflectivity, and outside of that range the mirror will be essentially transmissive. Therefore the mirror reflectivity $r_{mirror}$ will be very high for radiation emanating from the weld pool and coming back up through the exit lens for the scan head in some observation window of frequencies as defined by:

$$\omega_{MIN} < \omega_{RADIATION} < \omega_{MAX} \quad (6)$$

Figure 7:
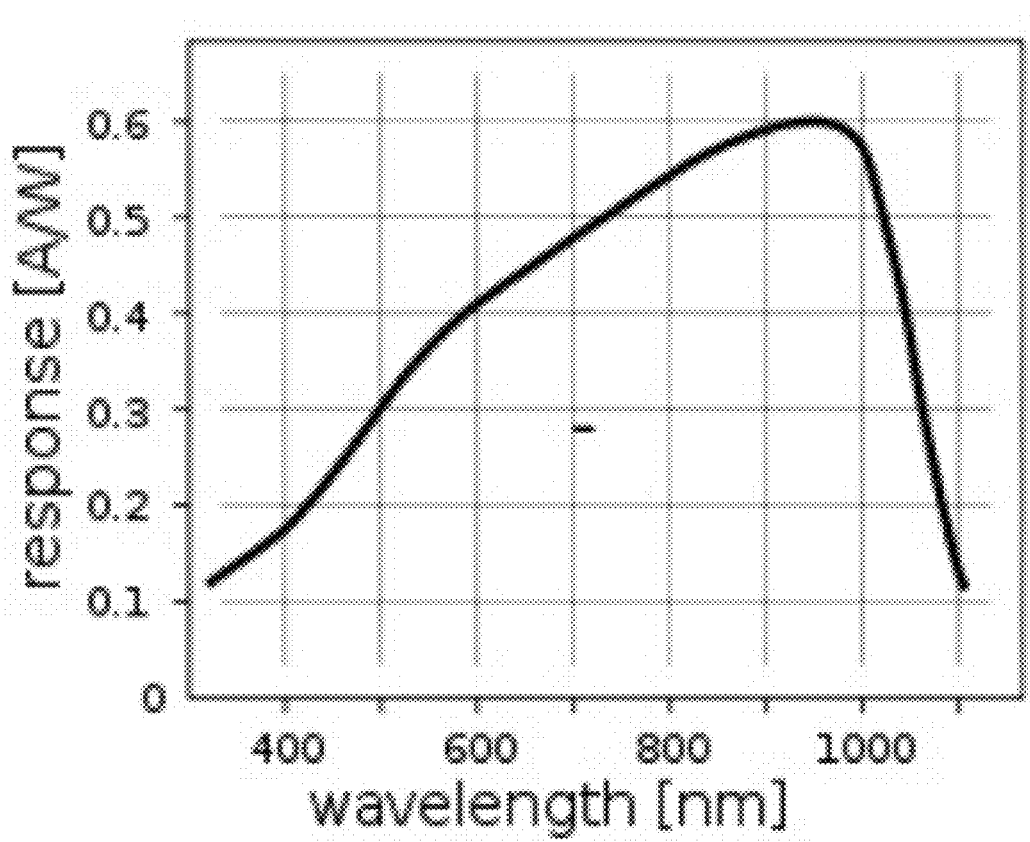
FIG. 7 shows a graph of the sensitivity of a silicon photodiode as a function of the wavelength of light incident thereon.

The sensitivity of the optical sensor depends specifically on the type of sensor utilized. For example, a typical sensitivity curve for a silicon photodiode is shown in FIG. 7. The curve describes the efficiency with which light is converted into current. The y-axis of FIG. 7 therefore is the conversion efficiency. The x-axis of FIG. 7 is the frequency of the incident radiation which is collected by the photodiode.

It is therefore seen that the transfer function as described in Equation 1 can in fact be derived by knowing the various factors defined in Equations 3-5 and the sensitivity of the sensor as described in FIG. 7. Therefore it is possible to perform a transformation which can bring the radiation collected at any arbitrary position in the powder bed or plane of the part into the reference frame of any other region of the part so that a comparison can be effected. More specifically in this invention, such a comparison will be made between the witness region and any other region of the part. A specific example will now be discussed that will further explain how such a transfer function could be used to effectively compare a witness coupon directly below the center of the exit lens of the scan head to any arbitrary region in the part or powder bed plane.

In general, the radiation flux collected at the exit lens to the scan head and the flux radiated by the weld pool are related by the view factor shown in Equations 2-4. The mirror will have minimum and maximum cutoff frequencies which define the window of frequencies of radiation which will be allowed to pass through to the photodiode collector. The photodiode collector will have conversion efficiency as specified by FIG. 7 and the average conversion efficiency is related to the cutoff frequencies of the mirror by the relationship:

$$f_{average} = \frac{f(\omega_{MIN}) + f(\omega_{MAX})}{2} \quad (7)$$

Where the efficiencies at the respective cutoff frequencies can be found from FIG. 7. Therefore, the overall transfer function relating the energy radiated from the weld pool at any (x,y) point and at any time t to the electrical signal as measured by the sensor (in this case the photodiode) could be represented to a first order by:

$$S(x,y,t) = T(x,y) \cdot E_{weldpool}(x,y,t) = \varepsilon \cdot f_{average} \cdot F_{d1-2}(x,y) * E_{weldpool}(x,y,t) \quad (8)$$

Where S(x,y,t) is the sensor signal from the emitted radiation when the weld pool was at location (x,y) at time t, and $E_{weld\ pool}(x,y,t)$ is the actual emitted radiation in energy per unit time per unit area radiated from location (x,y) at time t. Therefore to accurately compare the energy emitted at any given location to that at another location, we must solve Equation 7 for $E_{weld\ pool}$:

$$E_{weldpool}(x, y, t) = \frac{S(x, y, t)}{\varepsilon \cdot f_{average} \cdot F_{d1-2}(x, y)} \quad (9)$$

Therefore Equation 9 should be used to normalize the as-measured optical signal to more accurately compare data taken at different (x,y) locations in the powder bed or the plane of the part being sequentially built layer by layer.

Figure 8A:
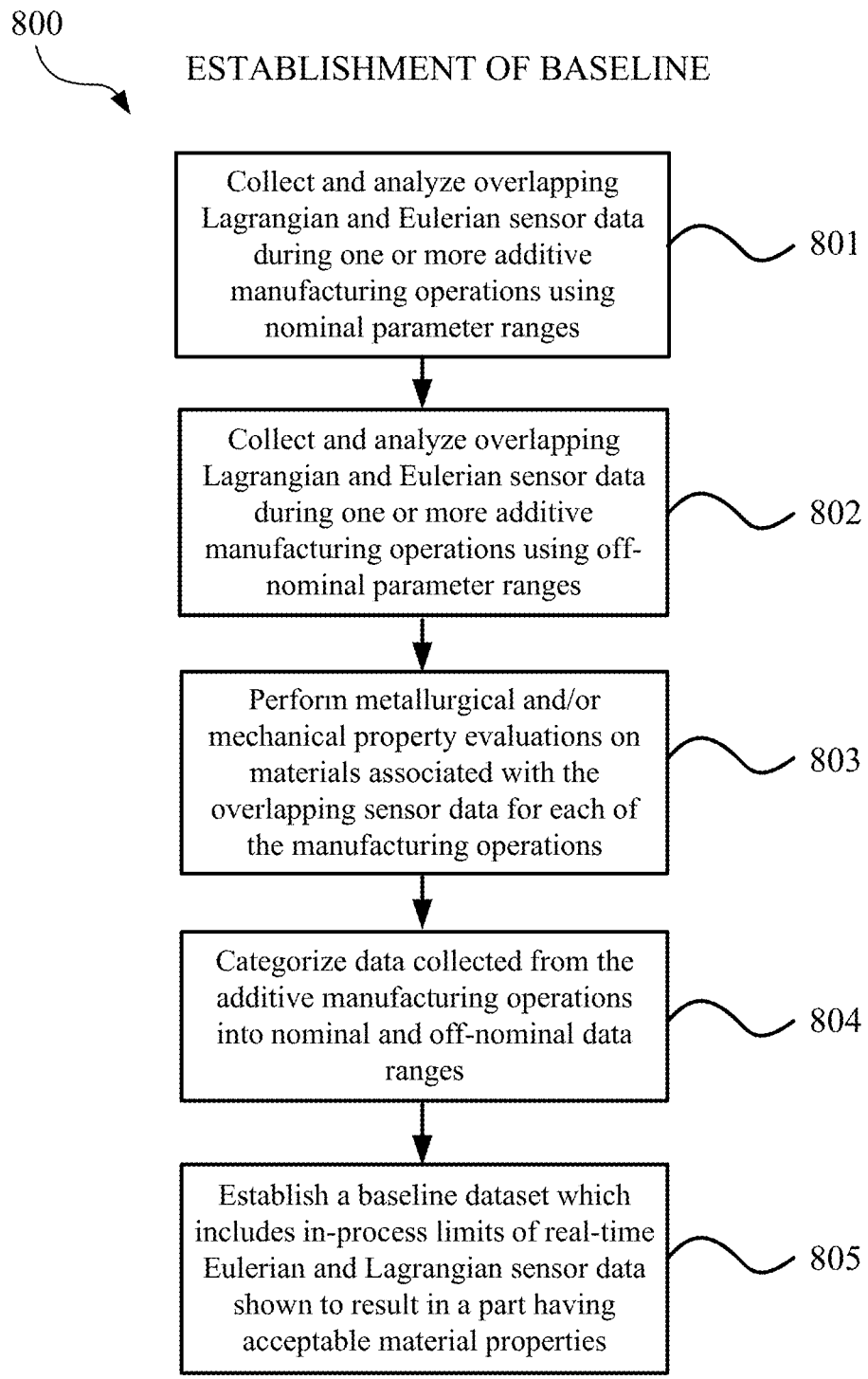
FIG. 8A is a flowchart illustrating a process for establishing a baseline parameter set for building a part according to an embodiment of the present invention.

FIG. 8A is a flowchart illustrating a process 800 for establishing a baseline parameter set for building a part according to an embodiment of the present invention. Referring to FIG. 8A, the method includes collecting and analyzing overlapping Eulerian and Lagrangian sensor data during one or more additive manufacturing operations using nominal parameter ranges (801). In some embodiments, the overlapping portion of the sensor data coincides with material that is separate and distinct from a part being constructed (sometimes this portion can be referred to as a witness coupon), while in other embodiments, the overlapping sensor data coincides with a portion of the part itself. In cases where the overlapping sensor data is located within the part itself, that portion of the part may need to be removed if verification of the micro-structural integrity of that portion is desired without destroying the part. The Eulerian and Lagrangian sensor data can be collected from multiple sensors such as pyrometers, infrared cameras, photodiodes and the like. The sensors can be arranged in numerous different configurations; however, in one particular embodiment a pyrometer can be configured as a Eulerian sensor focused on a fixed portion of the part, and a photodiode or other optical sensors, can be configured as a Lagrangian sensor, which follows the path of a heating element that scans across the part.

Data collection begins by testing nominal parameter ranges (i.e., those parameters or control inputs which are likely to result or have resulted in acceptable microstructure and/or acceptable mechanical properties and/or acceptable defect structures for a particular metal being utilized). In some embodiments, a user may begin with more or less precise parameter ranges when establishing the nominal parameter ranges. It should be understood that beginning with a more precise nominal parameter range can reduce the number of iterations needed to yield a sufficient number of data points falling within the nominal parameter ranges for a particular part. When a witness coupon is being utilized, it should be appreciated that the Lagrangian data can be transformed using the transfer function as indicated in Equation 9 for the region of the witness coupon.

Once a sufficient number of data points corresponding to the part having acceptable material properties have been collected, additional additive manufacturing operations are conducted using off-nominal parameter ranges. During these manufacturing operations, overlapping Eulerian and Lagrangian sensor data are collected and analyzed (802). Similar to the data collection method used with the nominal data collection, the sensors can focus on the same portion of the part utilized for the collection of nominal data. The Lagrangian data will again be transformed with the aid of Equation 9. Off-nominal parameter ranges are those parameter ranges (e.g., laser power, scan speed, etc.) that have been verified to result in unacceptable microstructure and/or mechanical properties and/or defect structures as determined by post-process destructive analysis of the witness coupon or equivalent regions of the build. Off-nominal data collection can include multiple part builds to establish boundaries or thresholds at which a part will be known to be defective. Off-nominal data collection can also include test runs in which laser power is periodically lowered or raised using otherwise nominal parameters to help characterize what effect temporary off parameter glitches can have on a production part. As described more fully below, collection and analysis of the in-process sensor data during a set of manufacturing processes using the off-nominal parameter conditions can be used to define the in-process limits for the in-process sensor data. Embodiments of the present invention, therefore, measure attributes of the process (i.e., in-process sensor data) in addition to measuring attributes of the part manufactured.

At 803, one or more portions of the part at which the Eulerian and Lagrangian sensor data overlaps (i.e. the witness coupon) are analyzed to help produce a baseline dataset. There are generally three kinds of analysis that could be performed on the witness coupon, or an equivalent region of the part. First, the microstructure could be examined in detail. This includes, but is not limited to, such analyses as grain size, grain boundary orientation, chemical composition at a macro and micro scale, precipitate size and distribution in the case of age hardenable alloys, and grain sizes of prior phases which may have formed first, provided that such evidence of these previous grains is evident. The second category of evaluations that could be conducted are mechanical properties testing. This includes, but is not limited to, such analyses as hardness/micro-hardness, tensile properties, elongation/ductility, fatigue performance, impact strength, fracture toughness and measurements of crack growth, thermos-mechanical fatigue, and creep. The third series of evaluations that could be conducted on witness coupons or equivalent regions of the build are the characterization of defects and anomalies. This includes, but is not limited to, analysis of porosity shape, size and distribution, analysis of crack size and distribution, evidence of inclusions from the primary melt, i.e., those form during the gas atomization of the powders themselves, other inclusions which may have inadvertently entered during the Additive Manufacturing process, and other common welding defects such as lack of fusion. It should also be noted that in certain cases a location of the witness coupon or focus of the pyrometer can be adjusted to provide a more accurate representation of particularly critical portions of the part.

At step 804, once both in-process sensor data (Eulerian and transformed Lagrangian data) as well as post-process data (microstructural, mechanical, and defect characterizations) have been collected, it is possible to use a wide variety of outlier detection schemes 804 and/or classification scheme that can bin the data into nominal and off-nominal conditions. Also, the process conditions resulting in a specific set of post-process data are characterized, the associated in-process data collected while the sample was being made. This in-process data, both Eulerian and Lagrangian, can be associated and correlated to the post-process sample characterization data. Therefore, a linkage can be made between distinct post-process conditions and the process signatures in the form of in-process data that produced those post-process conditions. More specifically, feature extracted from the in-process data can be directly linked and correlated to features extracted from the post-process inspection. In some embodiments, the data collected during manufacturing using the nominal parameter range will be distinct from the data collected during manufacturing using the off-nominal parameter ranges, for example, two distinct cluster diagrams. One of ordinary skill in the art would recognize many variations, modifications, and alternatives.

At step 805, once such features are established and correlated both in the real-time and post-process regimes, a process window can be defined based on the in-process limits of both Eulerian and Lagrangian data corresponding to nominal conditions, i.e., those conditions that have been verified to result in acceptable microstructure and/or acceptable mechanical properties and/or acceptable defect structures as determined by post-process destructive analysis of the witness coupon or equivalent regions in the build. Therefore the practical import of achieving this state is that the process may be defined to be in a nominal regime by virtue of actual in-process measurements directly corresponding to the physical behaviors occurring in the additive manufacturing process, as opposed to defining such a process window by using ranges of the machine settings, or other such variables included in a process parameter set, which are further removed from the process. In other words, embodiments of the present invention differ from conventional systems that only define process parameters. Embodiments of the present invention determine the in-process data for both nominal parameter ranges (801) and off-nominal ranges (802), providing an "in-process fingerprint" for a known set of conditions. Given that established baseline dataset, it is possible, for each material of interest and each set of processing conditions, to accurately predict the manufacturing outcome for a known-good product with desired metallurgical and/or mechanical properties.

It should be appreciated that the specific steps illustrated in FIG. 8A provide a particular method of establishing a baseline parameter set for building a part according to an embodiment of the present invention. Other sequences of steps may also be performed according to alternative embodiments. For example, alternative embodiments of the present invention may perform the steps outlined above in a different order. Moreover, the individual steps illustrated in FIG. 8A may include multiple sub-steps that may be performed in various sequences as appropriate to the individual step. Furthermore, additional steps may be added or removed depending on the particular applications. One of ordinary skill in the art would recognize many variations, modifications, and alternatives. Now the attention is shifted to the practical use of such a process window in a production environment.

Figure 8B:
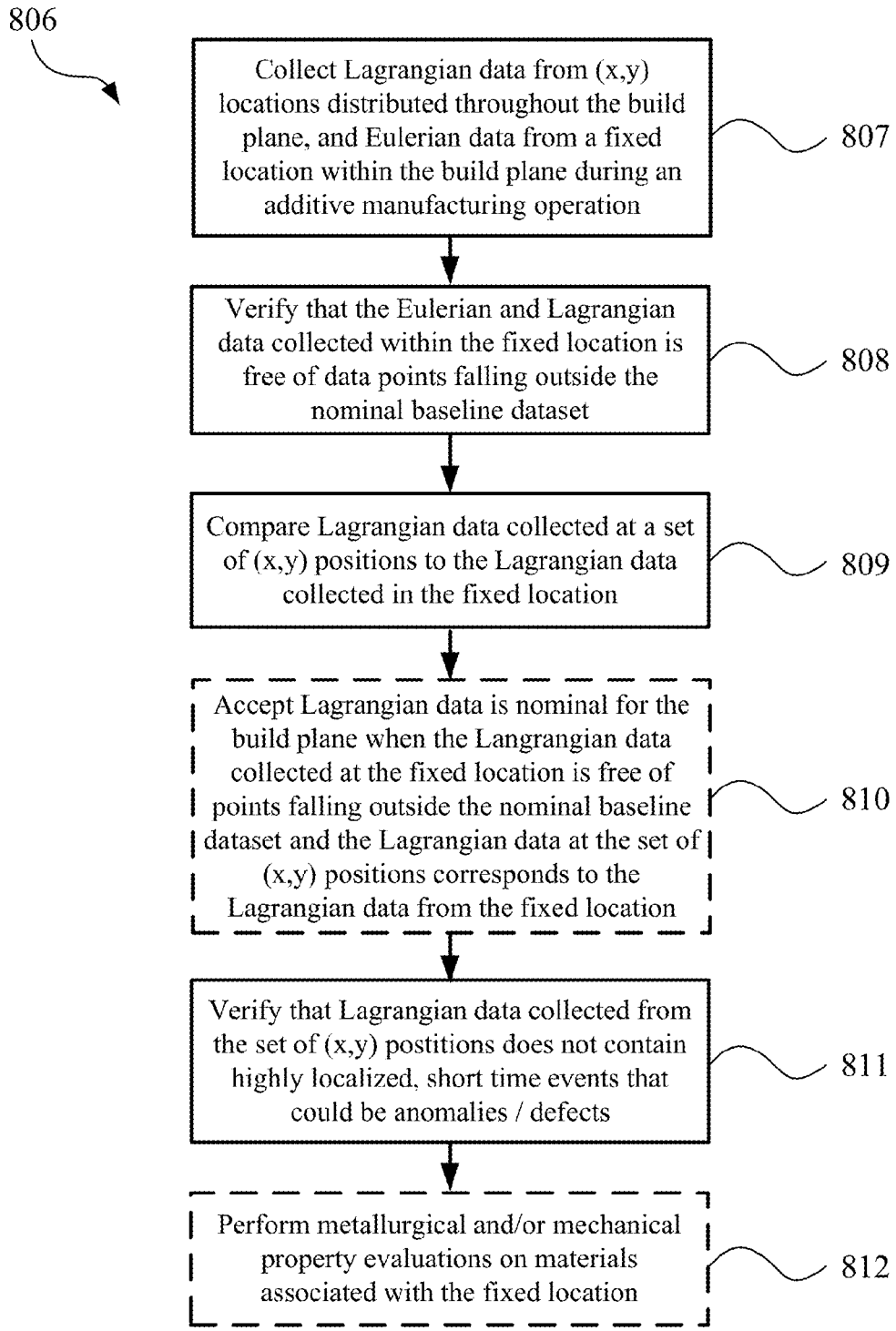
FIG. 8B is a flowchart illustrating a process for classifying a quality of a production level part based upon the established baseline parameter set according to an embodiment of the present invention.

FIG. 8B is a flowchart illustrating a process 806 for classifying a quality of a production level part based upon the established baseline parameter set according to an embodiment of the present invention. FIG. 8B shows process 806 describing the use of the baseline dataset in a build scenario. The baseline dataset can be established using the method illustrated in FIG. 8A.

Block 807 represents the collection, during an additive manufacturing process, of Lagrangian data from (x,y) locations distributed throughout the build plane and Eulerian data from a fixed location within the build plane. In one particular embodiment, the Lagrangian data can be collected by a photodiode and the Eulerian data can be collected by a pyrometer. The fixed location can be a witness coupon or a portion of the part that will be subsequently removed for testing. In some embodiments, the Lagrangian data can be collected from all locations in the build plane and the Eulerian data can only be collected at the fixed region of the witness coupon, although the present invention is not limited to this implementation. In other embodiments, a subset of all possible locations is utilized for collection of the Lagrangian data. The Lagrangian data is collected in the fixed region of the witness coupon as the melt pool passes through the witness coupon region. One of ordinary skill in the art would recognize many variations, modifications, and alternatives.

Block 808 describes a verification process that can be executed to determine whether the Eulerian and Lagrangian data collected within the fixed location is free of data points falling outside the nominal baseline dataset (i.e., within the region defined by the baseline dataset). The same classification and outlier detection scheme as was implemented during the establishment of the baseline in process 800 can be used to perform this verification. In other words, this step establishes that overlapping Eulerian and Lagrangian sensor readings taken during an actual production run corresponds to overlapping Eulerian and Lagrangian sensor readings recorded under nominal conditions as part of the baseline data set.

Block 809 describes the comparison of Lagrangian data collected at one or more (x,y) positions to the Lagrangian data collected in the fixed location. In some embodiments, the Lagrangian data collected at each of the (x,y) positions is compared to the Lagrangian data collected from the fixed region associated with the witness coupon. Thus, a set of in-process Lagrangian data associated with portions or all of the build platform can be compared with a set of in-process data from the witness coupon region. This step can be carried out subsequent to block 808 when it is established that the Lagrangian data from the fixed location in the production run was within the range of nominal conditions described in the baseline dataset. Accordingly, the embodiment illustrated in FIG. 8B compares the Lagrangian data set associated with some or all of the build platform areas with the Lagrangian data set from the witness coupon, as well as verifies that the in-process data is within the limits of the baseline dataset.

In optional block 810 when the verification and comparison from blocks 808 and 809 are completed successfully at all desired sampling points in the part, then the entire part is by logical inference, also within the limits of the nominal baseline data set.

Block 811 can provide a useful verification of a parts quality/conformance to the baseline dataset. Block 811 describes an additional verification that is carried out to verify that no anomalies exist in the Lagrangian signal of the build that did not exist in the baseline. As an example, short temporal anomalies and/or highly localized may physically represent some irregularity in the powder sintering, presence of a foreign object in the powder bed, a fluctuation in the laser power, melting at a highly localized level, or the like. An indication of an anomaly can then be provided to a system operator as appropriate. In response to the indication, a quality engineer may require that the part undergo additional testing to determine if the temporal anomaly will impact part performance. The verification process in 811 can differ from that performed in 808 since the time scale associated with the verification processes can be significantly different. Additionally, differing thresholds can be utilized to provide the appropriate filtering function. For example, the verification process can be applied to every data point collected that exceeds a fairly substantial threshold value while the process in 808 might only consider a smaller number of data points (i.e. at a reduced sampling rate) with a much lower threshold for irregular measurements. In some embodiments, block 811 can be optionally performed and is not required by the present invention. In some embodiments, the order of the verification processes in 808 and 811 is modified as appropriate to the particular application. In some embodiments, the verification process in 811 can be conducted using data from a different sensor than that used in block 808, for example the sensor associated with the verification can be a high speed camera sampling temperature data thousands of times per second. This high speed sensor could have a lower accuracy than a sensor associated with block 808 as it would be designed to catch very substantial but transitory deviations from the baseline dataset.

Lastly, block 812 describes an optional process. This optional process can be carried out when an overall confidence with the production part process is still in doubt. In such a case, material corresponding to the fixed location can be destructively tested to ensure that the post-process metallurgical, mechanical or defect-related features of the build witness coupon are within the same limits as those for a nominal baseline witness coupon. In some embodiments, the aforementioned destructive testing can be performed only periodically or in some cases not at all.

It should be noted that as part of the method of producing production parts, computer numerical control (CNC) machinery used to drive the additive machining toolset can also be responsible for executing certain actions based on the aforementioned sensor data. For example, multiple thresholds can be established and correlated with various actions taken by the CNC machinery. For example, a first threshold could trigger recording of an out of parameters event, a second threshold could prompt the system to alert an operator of the tool set, while a third threshold could be configured to cease production of the part.

Conversely, if any of these conditions are not met and if the (x,y) location of the Lagrangian data is known, then that specific region of the build or production run may be categorized as "off-nominal," or potentially suspect and potentially containing microstructure, mechanical properties, or defect distributions that are unacceptable.

Therefore FIGS. 8A-8B show embodiments of the present invention as it pertains to the use of in-process Eulerian and Lagrangian data in a production run, the relationship to baseline data and specifically baseline data taken from witness coupons made under nominal conditions known to produce acceptable post-process features, and the methodology by which the in-process Eulerian and Lagrangian data during build run together with the witness coupon associated with the build run may be used to accept a build run as nominal, i.e. representative of the baseline made using process conditions known to produce an acceptable microstructure and/or acceptable mechanical properties and/or acceptable defect distributions.

It should be appreciated that the specific steps illustrated in FIG. 8B provide a particular method of classifying a quality of a production level part based upon the established baseline parameter set according to an embodiment of the present invention. Other sequences of steps may also be performed according to alternative embodiments. For example, alternative embodiments of the present invention may perform the steps outlined above in a different order. Moreover, the individual steps illustrated in FIG. 8B may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 9:
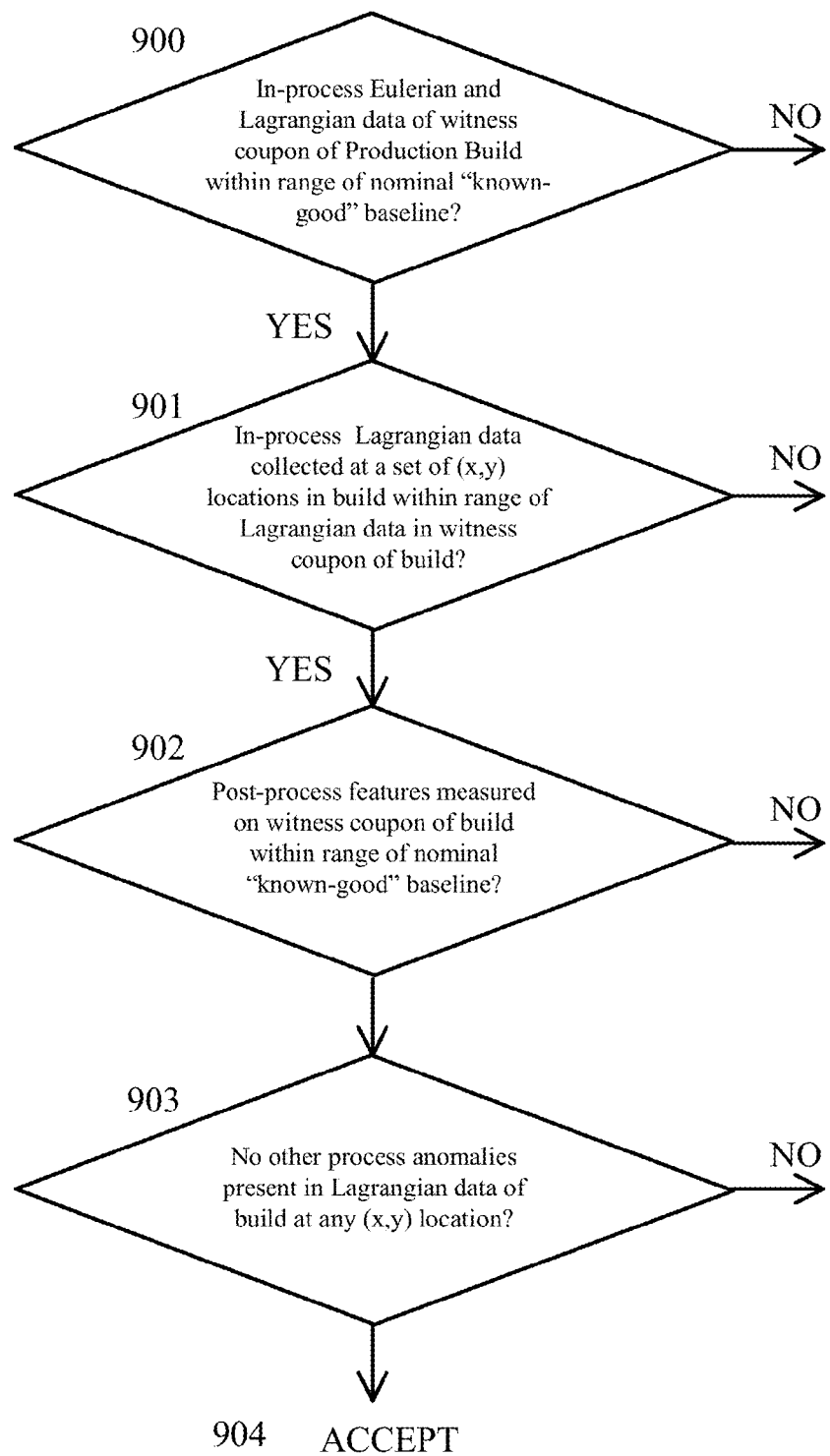
FIG. 9 is a logical flowchart and decision tree for accepting a build in production based on in-process data and analysis of a witness coupon.

FIG. 9 more concisely describes the logic flow of the decision process that is described in this invention to determine if a given production build should be accepted as nominal based on real-time, in-process data. There are FOUR decision boxes in this flowchart, and all four of the conditions must generally be met in order to categorize a build or production run as being acceptable based on real-time, in-process data (both Eulerian and Lagrangian). It should be noted that subsequent analysis and risk management logic can be applied to accept parts that fall short of meeting all the conditions. The first step of the decision tree 900 determines whether or not the portion of the build that includes overlapping Eulerian and Lagrangian sensor data (e.g. the witness coupon) is within the nominal, "known-good" range that constitute the baseline dataset. When the witness coupon of the production run does not have Eulerian and Lagrangian in-process data to support this premise, then the production run is labelled potentially suspect. The second step of the decision tree 901 establishes whether or not the Lagrangian data collected at one or more (x,y) locations in the build corresponds to the Lagrangian data collected in the region of the witness coupon for that same build. In some embodiments, as discussed above, the Lagrangian data can be collected for every location of interest in the build platform or for a subset of the locations in the build platform. As an example, a map of the part can be overlaid with the build platform to utilize the Lagrangian data for locations that correspond to the geometry of the part being manufactured. In other embodiments, the Lagrangian data is collected for portions of the build platform that correspond to the laser path or for portions of the build platform that correspond to the laser path when the laser is on. One of ordinary skill in the art would recognize many variations, modifications, and alternatives.

The third step of the decision tree establishes whether or not the post-process features measured on the witness coupon associated with the build are within the nominal, "known-good" range of post-process features measured on witness coupons which constitute the baseline data set. Finally, the fourth step of the decision tree establishes that there are no extraneous anomalous events in the Lagrangian data collected at any (x,y) location, i.e. are there any features seen the Lagrangian data of the build that were not seen in the baseline Lagrangian data. This additional step and final step is necessary, because outlier detection and classification are based on features. It is possible that over time new features that were not in the original baseline dataset may appear in the Lagrangian data.

In order to effectively make a classification or implement an outlier detection scheme to compare data from a production run to data from a baseline data set, features are first extracted from the real-time data. For an exemplary embodiment of this invention, suppose that the Eulerian sensor is a multi-color pyrometer, and suppose that the Lagrangian sensor is a silicon photodiode. Furthermore in the exemplary embodiment, the heat source is a scanning laser or electron beam, and the material addition is accomplished by pre-placement of powders between sintering layers. The table below describes features that may be extracted from the respective Eulerian and Lagrangian in-process data so that an effective comparison can be made between features in the baseline data set and features in the production run being assessed.

| EULERIAN FEATURES | LAGRANGIAN FEATURES |
|---|---|
| Scan Peak Temperature: when the laser or electron beam passes directly through the pyrometer field of view, this feature is the peak temperature of process during the high speed excursion of the laser or electron beam spot through the field of view. | Photodiode RMS: In the case of a laser-based process, the photodiode signal is the back-reflected radiation emitted by the weld pool and collected back through the optics and through a beam splitter. This feature is the RMS, or root mean square, of this signal intensity after the Transformation correction of Equation 9 has been applied. |

| EULERIAN FEATURES | LAGRANGIAN FEATURES |
| --- | --- |
| Scan Heating Rate: when the laser or electron Beam passes directly through the pyrometer field of view, this feature is the maximum heating rate of process during the high speed excursion of the laser or electron beam spot through the field of view. | Photodiode Standard Deviation: In the case of a laser-based process, the photodiode signal is the back-reflected radiation emitted by the weld pool and collected back through the optics and through a beam splitter. This feature is the standard deviation of this signal intensity after the Transformation correction of Equation 9 has been applied. |
| Scan Cooling Rate: when the laser or electron beam passes directly through the pyrometer field of view, this feature is the maximum cooling rate of process during the high speed excursion of the laser or electron beam spot through the field of view. | Photodiode Frequency Spectrum: In the case of a laser-based process, the photodiode signal is the back-reflected radiation emitted by the weld pool and collected back through the optics and through a beam splitter. This feature is the frequency spectrum of this signal intensity after the Transformation correction of Equation 9 has been applied. |
| Bulk Peak Temperature: when the laser or electron beam is not in the field of view of the pyrometer, the material will still exhibit a background thermal profile, and this feature is the peak temperature associated with this background thermal profile. | Photodiode Skew: In the case of a laser-based process, the photodiode signal is the back-reflected radiation emitted by the weld pool and collected back through the optics and through a beam splitter. This feature is the skew of this signal intensity after the Transformation correction of Equation 9 has been applied. |
| Bulk Heating Rate: when the laser or electron beam is not in the field of view of the pyrometer, the material will still exhibit a background thermal profile, and this feature is the maximum heating rate associated with this background thermal profile. | Photodiode Kurtosis: In the case of a laser-based process, the photodiode signal is the back-reflected radiation emitted by the weld pool and collected back through the optics and through a beam splitter. This feature is the kurtosis of this signal intensity after the Transformation correction of Equation 9 has been applied. |
| Bulk Cooling Rate: when the laser or electron beam is not in the field of view of the pyrometer, the material will still exhibit a background thermal profile, and this feature is the maximum cooling rate associated with this background thermal profile. | |

Note that all of these features may also be averaged over a given layer. Also, the Lagrangian data collected over the same region of the witness coupon where the Eulerian data is also being collected may be considered as a separate feature even though it is a subset of all of the Lagrangian features.

Additionally, with respect to the classification and outlier detection schemes, there are several possibilities. A few of these are listed in the Table below, but it is understood that a multitude of possible schemes could be implemented and would still fall within the spirit and intent of this invention.

| POSSIBLE CLASSIFICATION SCHEMES AND OUTLIER DETECTION METHODS |
| --- |
| Mahalanobis Distance (MD): this is a good method on account of the fact that it properly accounts for covariance in a multivariate feature space, and has a simple, non-subjective interpretation in that the MD-distance squared may be fitted to a Chi-Squared distribution, and the critical value of the Chi-Squared distribution at a given confidence level will determine the outlier cutoff value of the MD distance. |
| Extreme Value Statistics: utilizing for example the Generalized Extreme Value Distribution as opposed to a Chi-Squared Distribution (but still specifying a given confidence level), and similar analysis of outliers could be performed on any individual feature or set of features. |
| Arbitrary Limits: In lieu of algorithmically defined limits, there can be user-defined limits based on engineering experience. This is a practical alternative in some instances but runs the risk of introducing human subjectivity as well as difficulty in assessing the true false negative/false positive rates. |

Even though all of the steps in FIGS. 8A, 8B and 9 may be followed rigorously and the part is deemed acceptable based on in-process, real-time data, there still exists the question of sufficiency of the in-process data to fully characterize the quality of the component. Therefore in addition to the steps shown in FIGS. 8A, 8B and 9, there will need to be additional correlations with other physically independent post-process non-destructive inspection methods. Over time, these additional checks can be phased out or can be relegated to an infrequent, periodic sampling to ensure that the in-process, real-time data is still sufficiently capturing the process physics to enable such a quality inference as described in FIGS. 8A, 8B and 9 to be made.

However, even other non-destructive inspection methods such as ultrasonic and x-ray will have their own sensitivity, resolution, accuracy, probability of detection, false positive and false negative rates that will in general be different than those for the in-process real time measurements. So, as with any inspection method, there will be some residual risk that cannot be mitigated, short of destroying the component and exhaustively investigating its microstructure, mechanical properties and defect distributions. In fact such periodic completely destructive evaluations of actual production parts may be needed on an infrequent, periodic basis. Such evaluations will serve to further strengthen the validity of the correlations between the in-process, real-time data and part quality, but they are very costly and time-consuming and must therefore be kept to an absolute minimum required.

The specific details of such periodic sampling both for non-destructive as well as destructive evaluations to continuously check the validity of the in-process product acceptance approach will depend on the specific Additive Manufacturing applications. For example medical and aerospace will have different requirements as compared to automotive and power generation, and similarly for each specific domain where Additive Manufacturing is to be used to make functional, structural engineering components.

In the preferred embodiment described herein there are additional modalities in which the present invention may be used to facilitate manufacturing operations based on Additive Manufacturing. The Table below enumerates different scenarios that frequently arise in production, and specifically how the present invention addresses quality issues and problems in each if these scenarios.

| SCENARIO | SOLUTION TO QUALITY PROBLEMS |
| --- | --- |
| Movement of machine tools from one physical location to another. | The quality question herein is the re-qualification of a machine after it has been physically moved and/or partially disassembled to facilitate the move. The present invention offers a specific, platform-independent method for directly addressing such a quality concern: i) immediately prior to disassembly and move, a new baseline data set is captured that documents the machine state as well as the witness coupons that are produced by the machine while in physical location 1; ii) this baseline data set is used as the starting baseline data set for the re-qualification of the machine in physical location 2; iii) the methodology of FIG. 9 is applied to ensure that the machine in its new configuration is able to produce samples consistent with the previously recorded baseline made immediately prior to machine disassembly and move; iv) if this is the case, the machine is declared re-qualified without further effort needed. |
| Machine parameters transferred from one machine to another, both machines are of the same make and model but are physically distinct machines with different histories and perhaps different conditions of maintenance. | Although two machines are of the same make and model, they can have differences due to condition, maintenance, etc. which result in different production outcomes. Using the methodology described in this present invention, the following method may be employed to determine if the two machines are identical: i) collect a new baseline data set or utilize existing baseline data set on machine 1; ii) collect a new baseline data set or utilize existing baseline data set on machine 2; iii) compare all aspects of the two baselines using one the classification and/or outlier detection schemes mentioned above; iv) if the baselines are not from the same population, adjust one or the other machine until the in-process data as evidenced by additional witness coupon runs are identical or can be statistically grouped within the same population. |
| Manufacturing process transferred from one machine type to another Machine type. | This is generally the most difficult transition, as for Additive Manufacturing machines there can be very different scan strategies and local scan parameters. For example, laser power, laser spot size, laser travel speed, and line spacing/scan overlap are insufficient to fully describe the differences between one machine and another. Therefore the in-process data capture in this instance as described in this present invention is critical to minimizing experimental iterations and to ensuring that two parts made on two different machines will in fact have similar microstructure and properties. The method for accomplishing this using the invention described herein is identical to the description above for transferring parameter between identical machines, but with the following modifications: i) the machine parameter settings on the two machines will mostly likely be different; ii) scan strategies, to the extent that they can be controlled as inputs, should be made to be as close as possible; iii) adjustment to scan strategies on the target machine may be needed to achieve results similar to the original machine, and |

| SCENARIO | SOLUTION TO QUALITY PROBLEMS |
|---|---|
| | iv) all of the sample level iteration could be done on witness coupons assuming that Eulerian and Lagrangian data are available on both machines. |

There are some logical extensions and generalizations to the embodiments as described above, and these will now be described. First, the description of the embodiments above involves the use of a witness coupon for both development and during a build. If there is another alternate method of establishing the microstructure, mechanical properties, and defect distributions that result from a specific set of processing conditions, then this could be equally acceptable as a substitute for the witness coupon, i.e. the witness coupon is a desirable, but not absolutely necessary, component of this invention. In some embodiments, multiple witness coupons are utilized as appropriate.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:
1. An additive manufacturing method, comprising:
depositing a layer of metal material;
melting a region of the layer of metal material to form a part with a heat source that scans across the region of the layer of metal material to melt the region;
monitoring an amount of energy emitted by the heat source by maintaining a path along which the heat source scans the region within a first field of view of a first optical sensor to provide a first information set;
monitoring a fixed portion of the region of the layer of metal material with a second optical sensor to provide a second information set, the fixed portion of the region being positioned so that the path extends both into and out of a second field of view of the second optical sensor; and
subsequent to melting the region of the layer of metal material, determining whether the first and second information sets indicate the region falls within a known-good range of a baseline dataset associated with the part being produced by the additive manufacturing method by:
correlating data included in the second information set with data included in the first information set, wherein the data correlated from the first and second information sets was collected while the heat source passed through the fixed portion of the region;
calculating a plurality of state variables using at least a portion of the first information set and at least a portion of the second information set; and
comparing the plurality of state variables with a plurality of ranges associated with state variables of the known-good range of the baseline dataset; and
adjusting the additive manufacturing operation when the correlated information associated with the layer of metal material indicates an out of parameters event.
2. The additive manufacturing method as recited in claim 1 wherein the first optical sensor comprises a photodiode and the second optical sensor comprises a pyrometer.

3. The additive manufacturing method as recited in claim 1 further comprising destructively analyzing the fixed portion of the region monitored by the second optical sensor to determine whether a microstructure of the fixed portion is consistent with the layer falling within the known-good range.
4. The additive manufacturing method as recited in claim 3 wherein the fixed portion is separate and distinct from another portion of the region used to form the part.
5. The additive manufacturing method as recited in claim 3 wherein the fixed portion is removed from another portion of the region to form a channel within the part.
6. The additive manufacturing method as recited in claim 5 further comprising: subsequent to melting the region, repeating the method until the part is complete.
7. The additive manufacturing method as recited in claim 6 further comprising aggregating the state variables associated with each layer of the part and identifying which portions of the part are most likely to include a defect based upon the aggregated state variables.
8. The additive manufacturing method as recited in claim 6 wherein determining whether the part falls within the known-good range of the baseline data set is possible only when each portion of the part being monitored by the second optical sensor falls within the known-good range of the baseline dataset.
9. The additive manufacturing method as recited in claim 1 wherein the second optical sensor remains stationary throughout execution of the additive manufacturing method.
10. The additive manufacturing method as recited in claim 1 wherein the first information set is calibrated by referencing temperature increase and decrease information from the second information set.
11. The additive manufacturing method as recited in claim 1 wherein the heat source is a laser that shares the same optics as the first optical sensor.
12. An additive manufacturing method, comprising:
depositing a layer of metal powder;
melting a region of the layer of metal powder to form a part being produced by the additive manufacturing method with a heat source that scans across the region of the layer of metal powder to melt the region;
monitoring an amount of energy emitted by the scanning heat source with a first optical sensor that follows a path along which the heat source scans the region to provide a first information set;
monitoring a fixed portion of the region using a second optical sensor to provide a second information set, the fixed portion of the region being positioned such that the path is located both within and outside of a field of view of the second optical sensor; and
subsequent to melting the region of the layer of metal powder, determining whether the first and second information sets indicate the region falls within a known-good range of a baseline dataset associated with the part being produced by the additive manufacturing method by:

comparing at least a portion of the first and second information sets with ranges associated with the known-good range of the baseline dataset to identify one or more portions of the part that may include a manufacturing defect; and in response to the first and second information sets indicating the region falls outside of the known good range of the baseline dataset, adjusting the additive manufacturing operation.

13. The additive manufacturing method as recited in claim 12, wherein the region extends across all of a cross-sectional area of the part being produced.

14. The additive manufacturing method as recited in claim 13, wherein the second sensor collects a second information set that is correlated with the first information set when identifying the one or more portions of the part that may include a manufacturing defect.

15. The additive manufacturing method as recited in claim 12 wherein the heat source is a laser that shares the same optics as the first optical sensor.

* * * * *